US012197529B2

(12) United States Patent
Aher et al.

(10) Patent No.: US 12,197,529 B2
(45) Date of Patent: *Jan. 14, 2025

(54) REAL USER MONITORING STATISTICS FROM END USERS VIA PLUGIN OR BROWSER EXTENSION

(71) Applicant: Zscaler, Inc., San Jose, CA (US)

(72) Inventors: Vaibhav Aher, San Jose, CA (US); Khaireddine Mazboudi, San Jose, CA (US); Sandeep Kamath, Sunnyvale, CA (US); Srikanth Devarajan, Cupertino, CA (US); Chakkaravarthy Periyasamy Balaiah, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,574

(22) Filed: Mar. 21, 2023

(65) Prior Publication Data

US 2023/0385364 A1  Nov. 30, 2023

Related U.S. Application Data

(63) Continuation of application No. 17/498,037, filed on Oct. 11, 2021, which is a continuation-in-part of (Continued)

(51) Int. Cl.
*G06F 16/958* (2019.01)
*G06F 16/955* (2019.01)
(Continued)

(52) U.S. Cl.
CPC .......... *G06F 16/986* (2019.01); *G06F 16/955* (2019.01); *G06F 16/9577* (2019.01); *H04L 43/045* (2013.01)

(58) Field of Classification Search
CPC .. G06F 16/986; G06F 16/955; G06F 16/9577; H04L 43/045
(Continued)

(56) References Cited

U.S. PATENT DOCUMENTS 7,926,116 B2  4/2011  Kamath et al.
8,010,085 B2  8/2011  Apte et al.
(Continued)

FOREIGN PATENT DOCUMENTS

EP  2 517 406 B1  6/2015
EP  2 070 296 B1  10/2015

*Primary Examiner* — Hermon Asres
(74) *Attorney, Agent, or Firm* — Baratta Law PLLC; Lawrence A. Baratta, Jr.; Ryan Odessa

(57) ABSTRACT

A cloud service is executed on a plurality of nodes, each including at least one processor, and the cloud service is configured to communicate with a plurality of user devices, each user device associated with a user from an organization of a plurality of organizations, and each user device includes a plugin or browser extension installed thereon, provide configuration information to any of the plurality of user devices where the configuration information includes a plurality of domains to be monitored by the plugin or browser extension, wherein the plugin or browser extension is configured to monitor and/or determine real user monitoring (RUM) statistics when a given user device accesses one of the plurality of domains; and receive the RUM statistics from any of the plurality of user devices.

20 Claims, 39 Drawing Sheets

Related U.S. Application Data application No. 16/798,952, filed on Feb. 24, 2020, now Pat. No. 11,863,409, said application No. 16/284,073 is a continuation-in-part of application No. 16/284,106, filed on Feb. 25, 2019, now Pat. No. 10,938,686, which is a continuation-in-part of application No. 16/284,202, filed on Feb. 25, 2019, now Pat. No. 10,728,117, said application No. 16/798,952 is a continuation-in-part of application No. 16/284,073, filed on Feb. 25, 2019, now Pat. No. 10,892,964.

(51) Int. Cl.
*G06F 16/957* (2019.01)
*H04L 43/045* (2022.01)

(58) Field of Classification Search
USPC .......................................................... 709/224
See application file for complete search history.

(56) References Cited

U.S. PATENT DOCUMENTS

| | | | |
|---|---|---|---|
| 8,116,207 B2 | 2/2012 | Schekochikhin et al. | |
| 8,185,510 B2 | 5/2012 | Chaudhry et al. | |
| 8,230,054 B2 | 7/2012 | Mutnuru et al. | |
| 8,230,055 B2 | 7/2012 | Kondamuru et al. | |
| 8,259,571 B1 | 9/2012 | Raphel et al. | |
| 8,275,871 B2 | 9/2012 | Ram et al. | |
| 8,335,943 B2 | 12/2012 | Kamath et al. | |
| 8,429,111 B1 | 4/2013 | Kailash et al. | |
| 8,458,786 B1 | 6/2013 | Kailash et al. | |
| 8,464,335 B1 | 6/2013 | Sinha et al. | |
| 8,763,071 B2 | 6/2014 | Sinha et al. | |
| 8,812,904 B2 | 8/2014 | Kamath et al. | |
| 8,825,859 B2 | 9/2014 | Mutnuru et al. | |
| 8,832,260 B2 | 9/2014 | Raja et al. | |
| 8,838,630 B2 | 9/2014 | Bots et al. | |
| 8,887,249 B1 | 11/2014 | Schekochikhin et al. | |
| 8,955,091 B2 | 2/2015 | Kailash et al. | |
| 9,065,800 B2 | 6/2015 | Devarajan et al. | |
| 9,185,019 B2 | 11/2015 | Kamath et al. | |
| 9,426,220 B2 | 8/2016 | Chauhan et al. | |
| 9,471,469 B2 | 10/2016 | Mishra et al. | |
| 9,473,537 B2 | 10/2016 | Sinha et al. | |
| 9,519,518 B2 | 12/2016 | Kamath et al. | |
| 9,531,758 B2* | 12/2016 | Devarajan | H04L 63/20 |
| 9,569,195 B2* | 2/2017 | Schekochikhin | G06F 9/4416 |
| 9,596,299 B2 | 3/2017 | Yengalasetti et al. | |
| 9,596,305 B2 | 3/2017 | Chauhan et al. | |
| 9,619,542 B2 | 4/2017 | Kamath et al. | |
| 9,621,666 B2* | 4/2017 | Bots | H04L 67/5682 |
| 9,621,668 B2 | 4/2017 | Kamath et al. | |
| 9,760,283 B2* | 9/2017 | Kalipatnapu | G06F 3/0604 |
| 9,781,196 B2 | 10/2017 | Suganthi et al. | |
| 9,866,463 B2 | 1/2018 | Raja et al. | |
| 9,888,068 B2 | 2/2018 | Kamath et al. | |
| 9,912,638 B2 | 3/2018 | Kailash et al. | |
| 9,935,955 B2 | 4/2018 | Desai et al. | |
| 10,007,699 B2 | 6/2018 | Pangeni et al. | |
| 10,216,790 B2 | 2/2019 | Kailash et al. | |
| 10,432,651 B2 | 10/2019 | Pangeni et al. | |
| 10,728,117 B1 | 7/2020 | Sharma et al. | |
| 10,749,907 B2 | 8/2020 | Sinha et al. | |
| 10,824,409 B2 | 11/2020 | Arumugam et al. | |
| 10,846,136 B2 | 11/2020 | Muthiah et al. | |
| 10,880,377 B2 | 12/2020 | Ghatak et al. | |
| 10,892,964 B2 | 1/2021 | Sharma et al. | |
| 10,938,686 B2 | 3/2021 | Sharma et al. | |
| 2008/0114875 A1* | 5/2008 | Anastas | G06Q 30/02 709/224 |
| 2011/0185436 A1* | 7/2011 | Koulinitch | H04L 63/10 726/28 |
| 2014/0344345 A1* | 11/2014 | Venkatraman | G06F 16/957 709/203 |
| 2015/0067146 A1* | 3/2015 | Raker | G06F 11/3006 709/224 |
| 2018/0054737 A1* | 2/2018 | Guo | H04L 67/141 |
| 2020/0259792 A1 | 8/2020 | Devarajan et al. | |
| 2020/0259793 A1 | 8/2020 | Pangeni et al. | |
| 2021/0119798 A1 | 4/2021 | Bayar et al. | |

* cited by examiner

FIG. 11

```
45 LOCATIONS                          SCORE         USERS
  └─► NEW YORK
        └─► 10th STREET       ─        76            784
        └─► ACME CORP         ─        89          UNKNOWN
        └─► FIN DISTRICT      ─       (49)           280
              ⋮
  └─► NEW JERSEY
        └─► TOWN (8th FLOOR)  ─        76            600
        └─► CALDWELL          ─        94            400
  └─► CAMDEN                  ─       (34)           700
  └─► ROAD WARRIOR            ─        84          2,600
```

FIG. 12

FIN DISTRICT
TOTAL USERS – 280
↓ (31)

| | | TODAY ▽ | USER ▽ |
| | | WEEK | APP |
| | | MONTH | DEVICE |

| USER | SCORE | %CHANGE | IMPACTED APPS |
|---|---|---|---|
| MANOJ | 36 | +46 | O365, BOX |
| JAY | 64 | +11 | O365 |
| AMIT | 75 | +5 | -NONE- |
| BILL | 16 | -80 | O365 |
| JOE | 25 | +50 | O365 |
| ⋮ | | | |

FIG. 32

REAL USER MONITORING STATISTICS FROM END USERS VIA PLUGIN OR BROWSER EXTENSION

CROSS-REFERENCE TO RELATED APPLICATION(S)

This patent/application is a continuation of U.S. patent application Ser. No. 17/498,037, filed Oct. 11, 2021, and entitled "Real User Monitoring statistics from end users," and which is a continuation-in-part of co-pending U.S. patent application Ser. No. 16/798,952, filed Feb. 24, 2020, and entitled "Systems and methods for alerting administrators of a monitored digital user experience," which is a continuation-in-part of U.S. patent application Ser. No. 16/284,073 filed Feb. 25, 2019 (now U.S. Pat. No. 10,892,964 which issued on Jan. 12, 2021), and entitled "SYSTEMS AND METHODS FOR MONITORING DIGITAL USER EXPERIENCE," a continuation-in-part of U.S. patent application Ser. No. 16/284,106 filed Feb. 25, 2019 (now U.S. Pat. No. 10,938,686 which issued on Mar. 2, 2021), and entitled "SYSTEMS AND METHODS FOR ANALYZING DIGITAL USER EXPERIENCE," and a continuation-in-part of U.S. patent application Ser. No. 16/284,202 filed Feb. 25, 2019 (now U.S. Pat. No. 10,728,117, which issued on Jul. 28, 2020), and entitled "SYSTEMS AND METHODS FOR IMPROVING DIGITAL USER EXPERIENCE," the contents of each are incorporated in full by reference herein.

FIELD OF THE DISCLOSURE

The present disclosure generally relates to computer networking systems and methods. More particularly, the present disclosure relates to systems and methods for Real User Monitoring (RUM) for statistics from end users.

BACKGROUND OF THE DISCLOSURE

Generally, User Experience (UX or UEX) seeks to quantify an individual user's satisfaction with a product or service such as a networking application. In networking, End User Experience Monitoring (EUEM) tools conventionally focus on observations, i.e., tests, instead of monitoring, i.e., continuous feedback. For example, conventional EUEM tools focus on page load and response time over Hypertext Transfer Protocol (HTTP). While this approach can provide insight, there are limitations as these measurements may vary by time of day, location, etc., provide little input into remedial actions, are reactive and merely snapshots in time, etc. Network Performance Monitoring and Diagnostics Market (NPMD) tools allow for Information Technology (IT) operations to understand the performance of applications, the network and infrastructure components via network instrumentation. Additionally, these tools provide insight into the quality of end user experience. The goal of NPMD products is not only to monitor the network components to facilitate outage and degradation resolution but also to identify performance optimization opportunities. This is conducted via diagnostics, analytics, and debugging capabilities to complement additional monitoring of today's complex IT environments. Application Performance Monitoring (APM) is the monitoring and management of performance and availability of software applications. APM strives to detect and diagnose complex application performance problems to maintain an expected level of service. Digital Experience Monitoring (DEM) goes beyond APM and EUEM. EUEM looks specifically at the human end-user or customer interaction with an application. APM focuses on the performance and availability of the application. DEM is the experience of all digital agents—human and machine—as they interact with enterprises' application and service portfolios. A problem with conventional DEM is the inability to obtain end-to-end data. Conventional DEM dataset sources include lightweight instrumentation of devices and endpoints, JavaScript injected web pages (Server side), network-extracted packets and flows (client side), synthetic transaction executions, Application Programming Interfaces (APIs) and social media feeds, etc. The lightweight instrumentation can include Web-page-injected snippets such as JavaScript code acting as mini-agents that capture and send data from an endpoint once a Web page has been rendered. Packet capture applications can include both custom hardware and software-based components that capture packets from the network and interpret protocol information. Operating System (OS)-resident agents can capture and send data directly from the endpoint or device. Synthetic transactions can be run as tests to obtain results for applications, services, or digital business processes. Finally, social-media-based information (including sentiment data), collective intelligence benchmarking, and API data feeds are being added to the DEM ingestion level.

Disadvantageously, the above approaches for data gathering for DEM are all reactive in the sense these techniques are implemented periodically or on demand. This is not real-time, continuous data that actually reflects the user's actual experiences, but rather reflects a synthetic transaction or a snapshot in time that may infer actual digital experience. For effective DEM, it is necessary to continuously capture data related to an end-to-end application including availability, latency, quality, etc. for monitoring, analyzing, and improving digital user experience. Stated differently, the conventional approaches include passive performance monitoring using techniques such as traffic sniffing and injection or active performance monitoring with a synthetic approach where network probes are used to simulate traffic. However, neither of these capture actual user experience.

BRIEF SUMMARY OF THE DISCLOSURE

The present disclosure relates to systems and methods for Real User Monitoring (RUM) for statistics from end users. In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. Systems and methods for implemented by a user device for Real User Monitoring (RUM) include operating an add on for a web browser; receiving a list of domains or Uniform Resource Locators (URLs) to calculate RUM data thereon; responsive to the web browser accessing any of the domains or URLs in the list, calculating and storing RUM data; and periodically sending the stored RUM data to a cloud-based system. The RUM data can include statistics, metrics, and errors that are detected based on any of start of navigation, redirects, Domain Name System (DBS), connection establishment and teardown, Hypertext Transfer Protocol (HTTP) request and response start and end, Document Object Model (DOM) load time, page load time, and Java Script and AJAX error detection.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

FIGS. 11-24 are various screenshots of a Graphical User Interface (GUI) associated with the analysis service to display, report, and provide a drill-down of the User Experience (UEX) scores.

FIG. 32 is a GUI of a rules tab of alerts dashboard.

DETAILED DESCRIPTION OF THE DISCLOSURE

The present disclosure relates to systems and methods for monitoring, analyzing, and improving digital user experience. The systems and methods provide experience monitoring in the context of Software-as-a-Service (SaaS) and the cloud, including end user experience monitoring, network/server/endpoint monitoring, cloud application performance monitoring (e.g., Azure, AWS, GCP), SaaS application performance monitoring (GCP, Office 365, Salesforce, Skype), Voice over Internet Protocol (VOIP) and other real-time application performance monitoring, Web performance monitoring, etc.

The systems and methods include a digital experience monitoring platform which does not require new hardware or software in the network. Rather, the digital experience monitoring platform leverages an existing cloud infrastructure, namely a distributed security cloud, lightweight connectors at the edge for access to applications, and an application at endpoints such as user devices. Such components are already in place in Zscaler's distributed security cloud. Also, these components perform inline processing, enabling a real-time collection of data for the digital experience monitoring platform. Advantageously, by leveraging existing infrastructure, the digital experience monitoring platform provides real-time data which can be used for remediation and requires no additional equipment. For example, the digital experience monitoring platform can enable an intelligent path selection in real-time for a user. Thus, the digital experience monitoring platform is proactive, not reactive.

Aspects of the digital experience monitoring platform include monitoring Internet traffic, destination monitoring, tunnel monitoring, health monitoring for the cloud, etc. This can include endpoint metrics, Service Layer Agreement (SLA) monitoring, Anomaly detection/Security Operations Center (SOC) Integration, topology mapping, packet captures and flow-based monitoring, User Experience (UEX) Score, Infrastructure-as-a-Service (IaaS) monitoring/integration, change monitoring, Autonomous System (AS) monitoring, third-party network monitoring, etc.

The objective here is proactive, not reactive, monitoring of end users to detect, as early as possible, issues that impact true user experience and productivity such as to identify root cause of performance issues with actionable insights for remediation. This is performed by correlating user performance in the context of network metrics, application metrics, and endpoint device metrics.

§ 1.0 EXAMPLE CLOUD-BASED SYSTEM ARCHITECTURE

Figure 1:
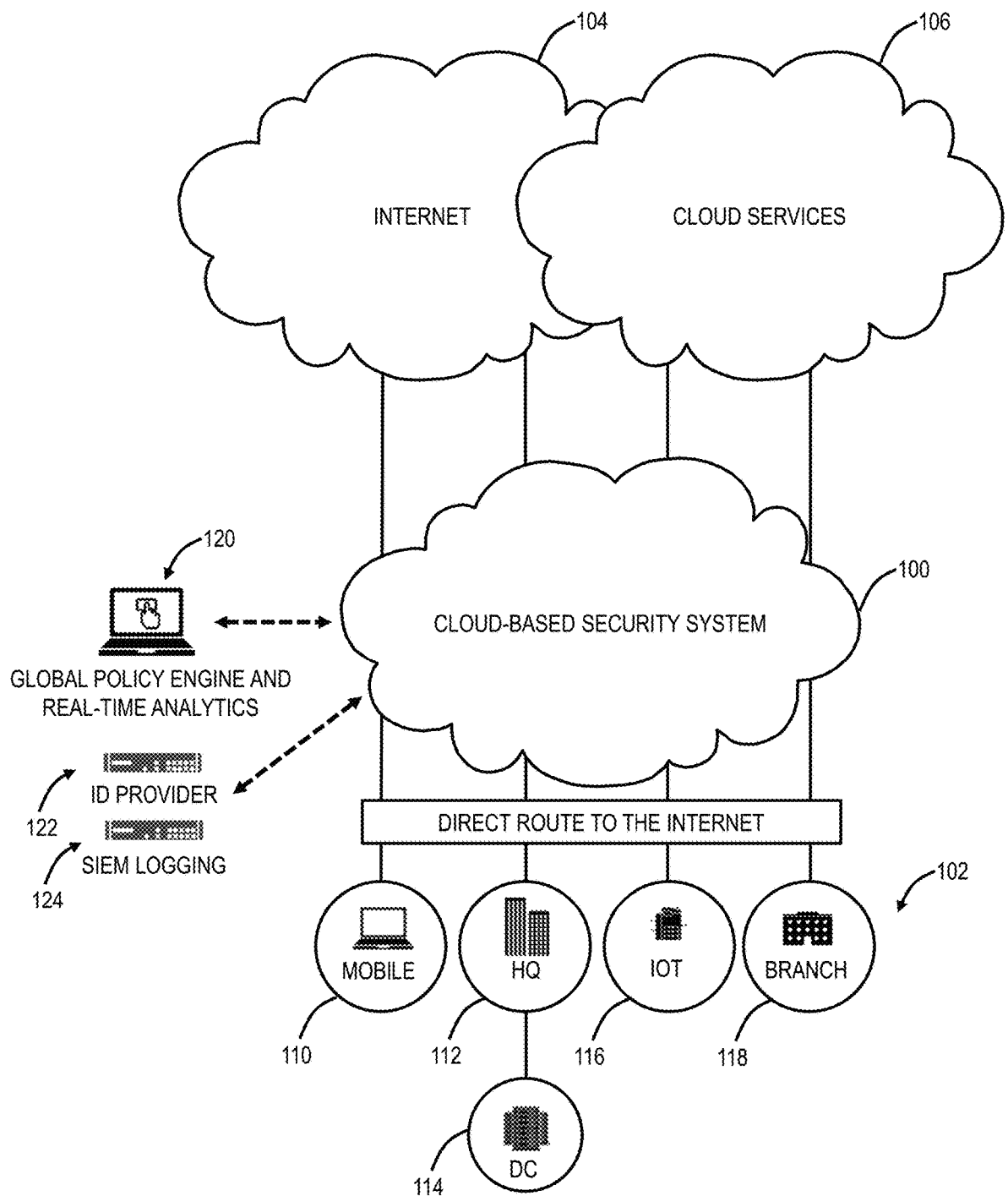
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
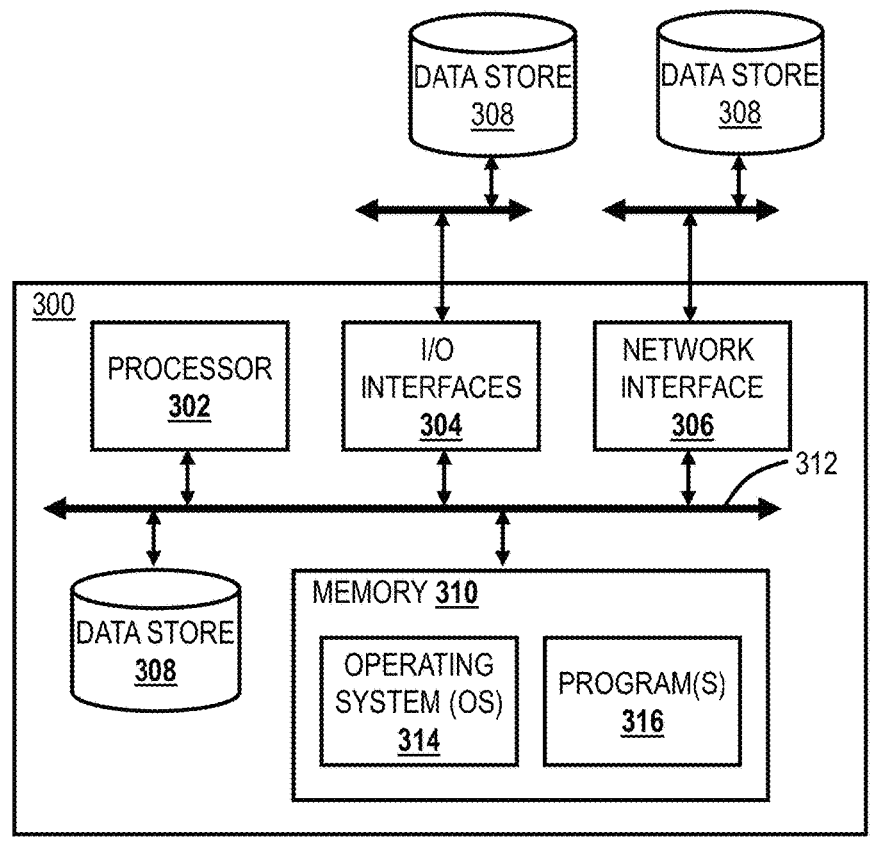

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

§ 2.0 CLOUD-BASED SYSTEM DETAILS

Figure 2:
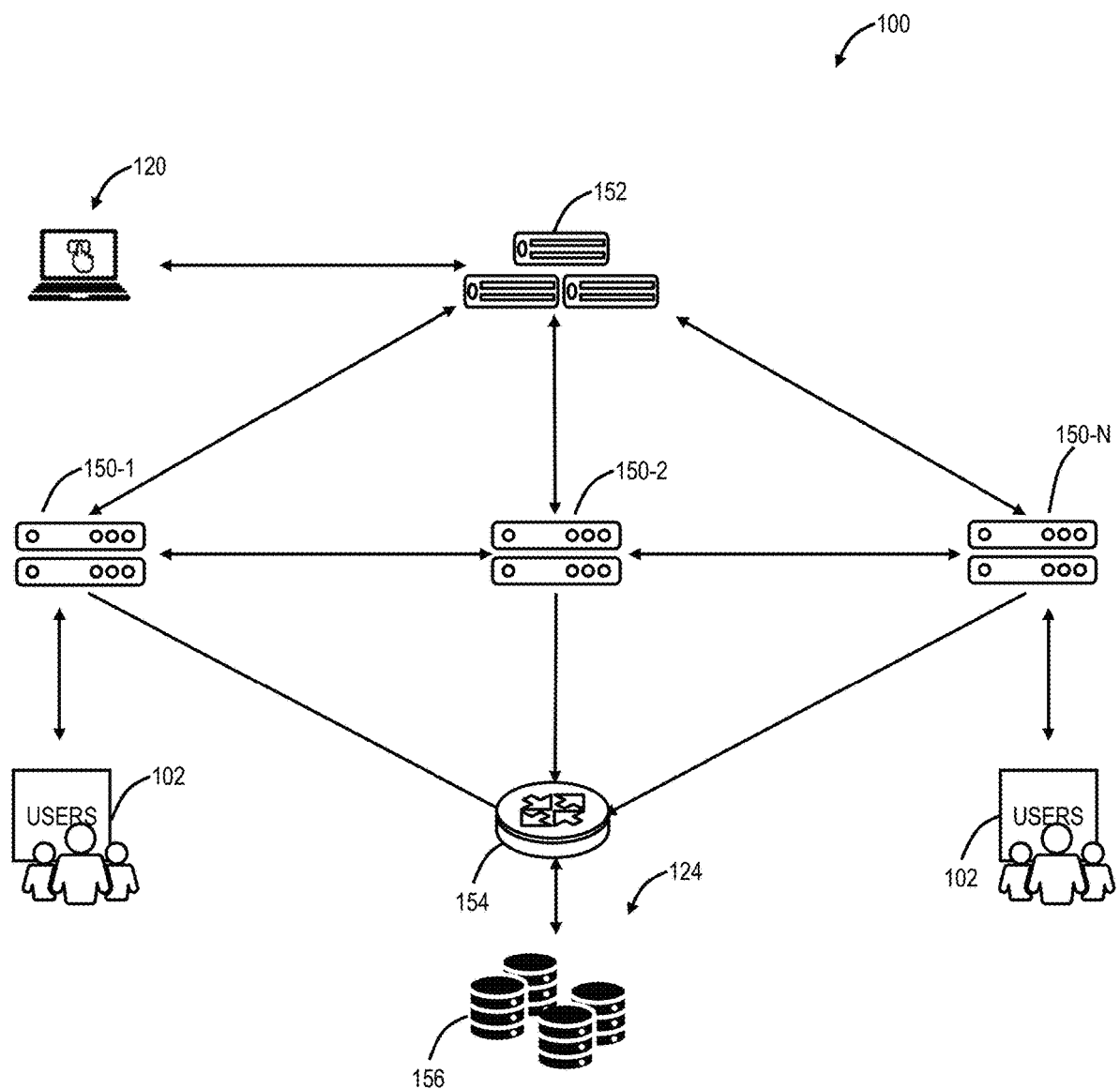
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is process through one of the enforcement nodes 150.

Each of the enforcement nodes 150 may generate a decision vector D=[d1, d2, ..., dn] for a content item of one or more parts C=[c1, c2, ..., cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, ..., cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, micro-service segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 3.0 EXAMPLE SERVER ARCHITECTURE

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 EXAMPLE USER DEVICE ARCHITECTURE

Figure 4:
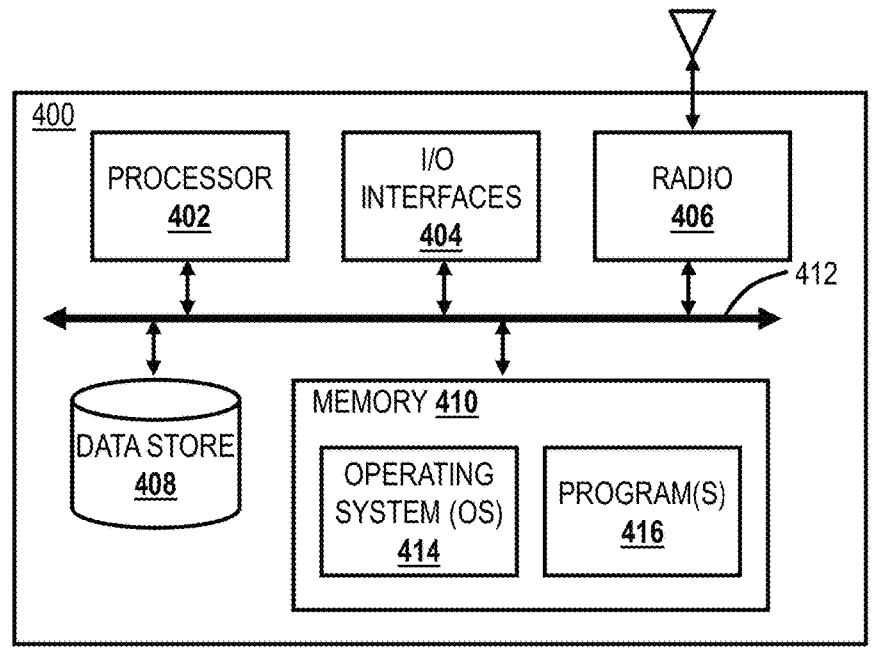

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The present disclosure relates to mobile devices, which are one subset of the user device 300. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 USER DEVICE APPLICATION FOR TRAFFIC FORWARDING AND MONITORING

Figure 5:
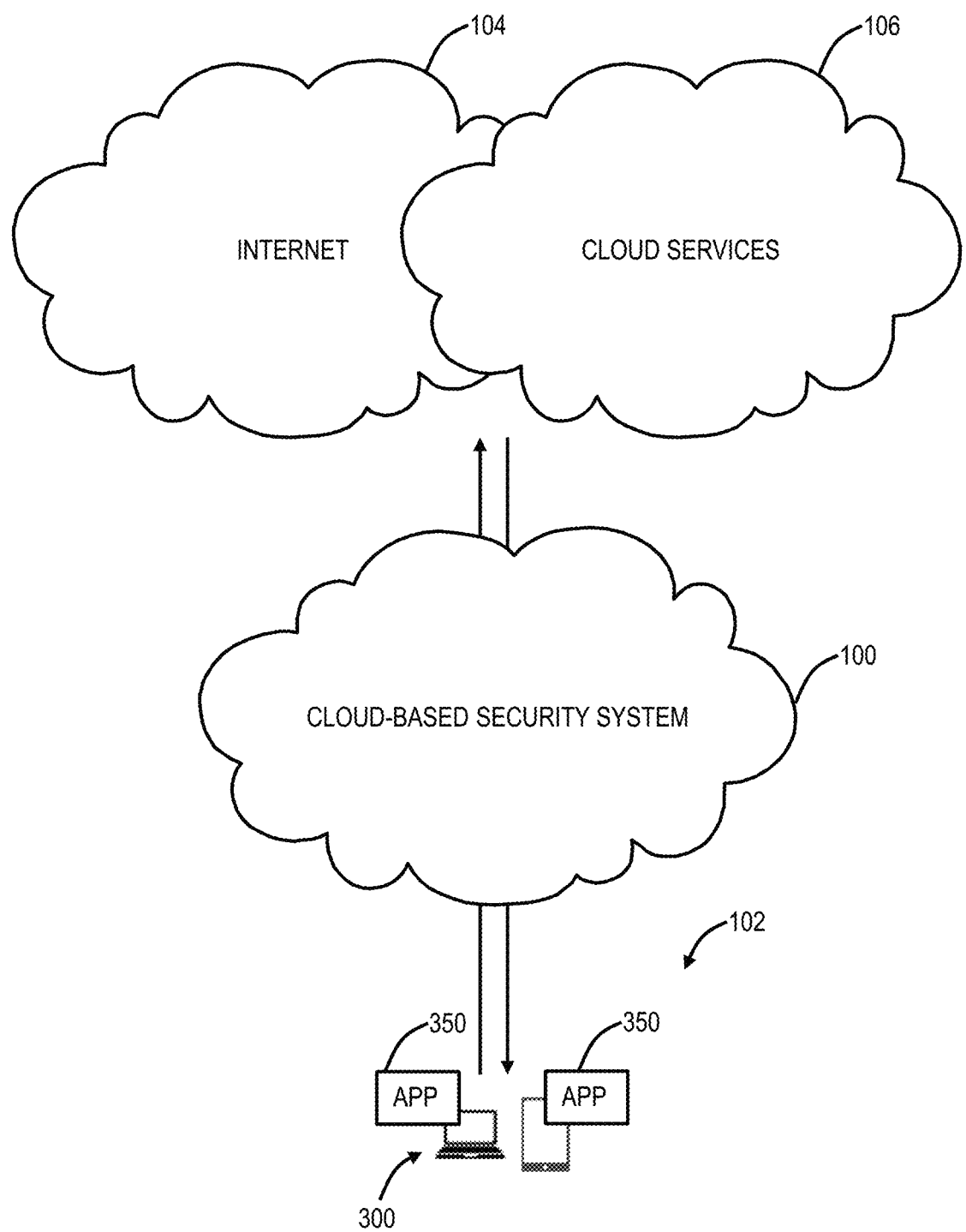
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

§ 6.0 ZERO TRUST NETWORK ACCESS USING THE CLOUD-BASED SYSTEM

Figure 6:
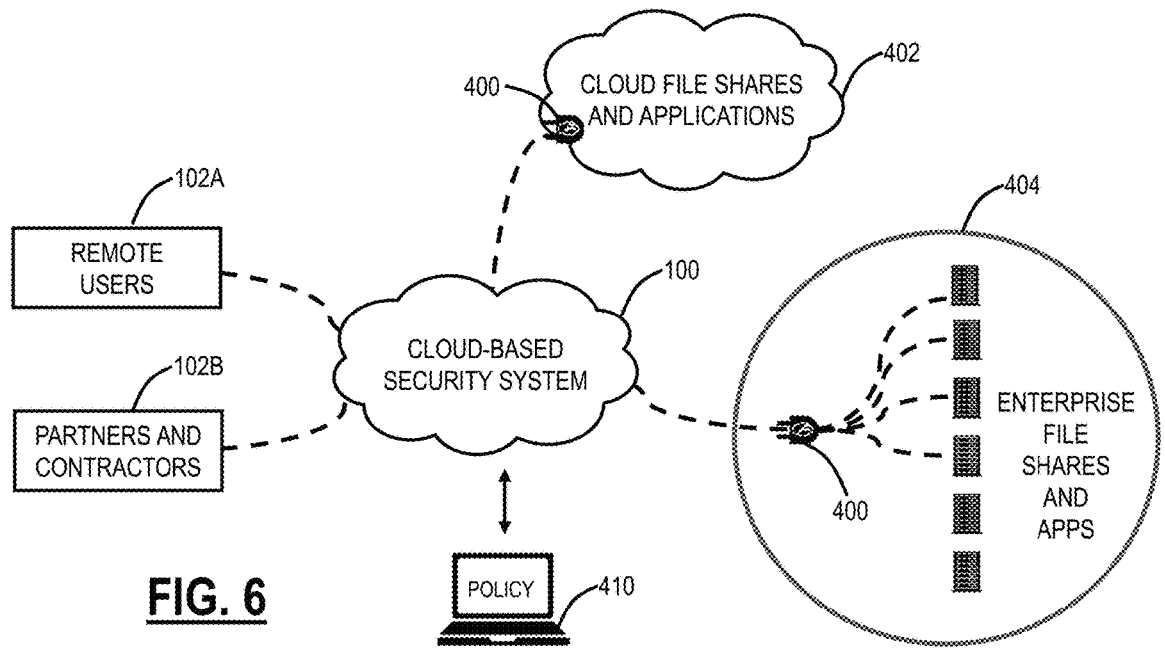
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority node 152 to push policy 410, and the cloud-based system 100 to stitch the applications 402, 404 and the software connectors 402, 404 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. can include the ZPA service from Zscaler, Inc.

§ 7.0 UNIFIED AGENT APPLICATION

Figure 7:
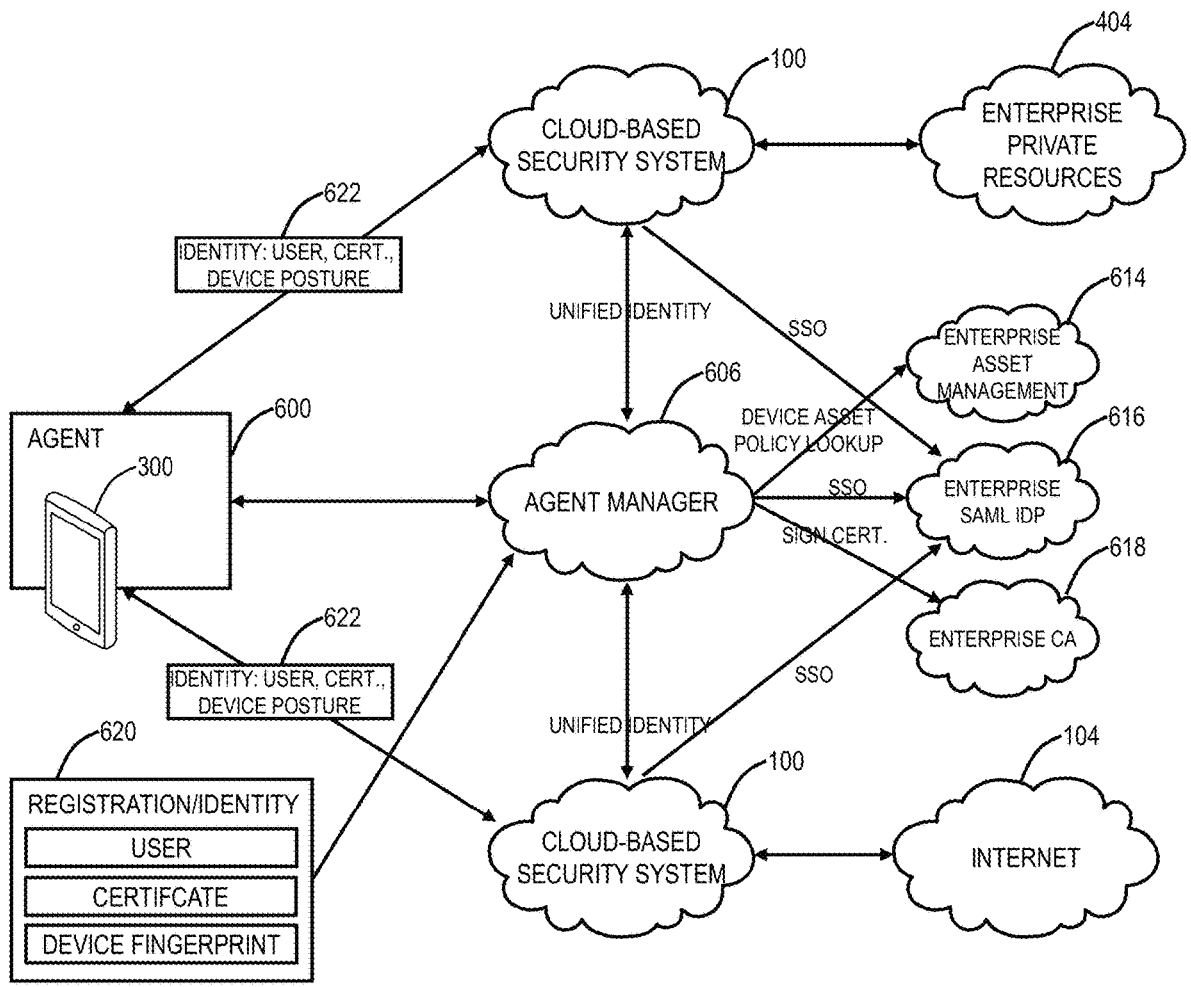
FIG. 7 is a network diagram of a unified agent application and associated connectivity and functionality with the cloud-based system.

FIG. 7 is a network diagram of the use of the application 350 as a unified agent application and associated connectivity and functionality with the cloud-based system 100. Again, the unified agent application 350 is executed on a user device 300. The unified agent application 350 dynamically learns all available services, adapts to changing network environments, and provides a seamless and secure network resource access to Internet and darknet hosted applications. This is achieved through dynamic evaluation of network conditions, enrollment to individual services, learning individual service protocols, creating a link-local network on the user device 300, and establishing multiple secure tunnels to cloud services over this local network.

The unified agent application 350 is communicatively coupled to an agent manager cloud 606, as well as the cloud-based system 100. The unified agent application 350 enables communication to enterprise private resources on the enterprise network 404 via the cloud-based system 100 and to the Internet 104 via the cloud-based system 100. The agent manager cloud 606 can communicate with enterprise asset management 614, an enterprise Security Assertion Markup Language (SAML) Identity Provider (IDP) 616, and an enterprise Certificate Authority (CA) 618. The user device 300 and the unified agent application 350 can perform a registration/identity 620 process through the agent manager cloud 606 where the user identity, the user's certificates, and a device fingerprint can uniquely identify the user device 300. Once registered, the unified agent application 350 has an identity 622, which can include the user, certificates, device posture, etc. and which is shared with the cloud-based system 100.

The unified agent application 350 operates on a client-server model where an IT admin enables appropriate services for end users at a Cloud Administration Server (CAS), which can be part of the agent manager cloud 606, namely the enterprise asset management 614. Every client can make a unicast request to the agent manager cloud 606 (e.g., CAS) to discover all enabled services. On acknowledging the response, the client issues a request to authenticate to each service's cloud Identity Providers, the enterprise SAML IDP 616. Authentication can be multi-factor depending upon the nature of the service. On successful authentication, server contacts Mobile Device Management (MDM) or Inventory management provider to define access control rights for the user device 300. Post authorization, the user device 300 is successfully enrolled in the agent manager cloud 606, which tracks and monitors all behavior of the user device 300.

Post-enrollment, the user device 300 creates a link local network with a specific IP configuration, opens a virtual network interface to read and write packets to create secure tunnels to available services through the cloud-based system 100. On network changes, the user device 300 dynamically evaluates reachability to pre-configured domains and depending upon the result, it appropriately transitions all network tunnels, thus providing a seamless experience to the end user. Further, the user device 300 also intelligently learns the conditions which are appropriate for setting up network tunnels to cloud services depending upon several network heuristics such as reachability to a particular cloud service.

§ 7.1 Unified Agent Application—Functionality

Generally, the unified agent application 350 supports two broad functional categories—1) dynamic service discovery and access controls and 2) service availability. The dynamic service discovery and access controls include service configuration by the administrator, service discovery by the user device 300, service acknowledgment and authentication, service authorization and enrollment, and the like. For service configuration by the administrator, the IT admin can provide cloud service details at a centralized knowledge server, such as part of the agent manager cloud 606, the enterprise asset management 614, etc. The cloud service details include the service type (e.g., Internet/intranet), network protocol, identity provider, server address, port, and access controls, etc.

For service discovery by the user device 300, the user device 300 can issue a network request to a known Cloud Administrative Server (CAS) in the agent manager cloud 606 to discover all enabled services for a user. If a specific cloud server is not known a priori, the user device 300 can broadcast the request to multiple clouds, e.g., through the agent manager cloud 606 communicating to the enterprise asset management 614, the enterprise SAML IDP 616, and the enterprise CA 618.

For the service acknowledgment and authentication, the user device 300 acknowledges the response of service discovery and initiates the authentication flow. The user device 300 learns the authentication protocol through the service discovery configuration and performs authentication of a configured nature at the enterprise SAML IDP 616. For the service authorization and enrollment, post successful authentication, the CAS, authorizes the user device 300, and fetches the access control information by contacting an MDM/Inventory Solutions Provider. Depending upon the user context and the nature of access, the CAS enrolls the user device 300 into several cloud services and informs the cloud services that the user has been enrolled for access.

The service availability includes link local network setup, a traffic interceptor, and dynamic traffic forwarding tunnels to authorized services. The link-local network setup, post-enrollment, has the user device 300 create a local network on the user device 300 itself to manage various networking functionalities. For the traffic interceptor, the user device 300 intercepts and evaluates all Internet traffic. Allowed traffic is tunneled to the cloud services such as in the cloud-based system 100, whereas the rest of the traffic is denied as per enterprise policies. For the dynamic traffic forwarding tunnels to authorized services, depending upon the evaluation, the user device 300 splits the traffic into the different tunnel to individual cloud services such as in the cloud-based system 100.

The unified agent application 350 is a single application that provides secure connectivity to the Internet 104 and darknet hosted applications, such as the enterprise private resources in the enterprise network 404. The unified agent application 350 communicates securely to the agent manager 606, which is controlled by an IT admin. The unified agent application 350 learns available services and authenticates with each service. Post proper enrollment, the unified agent application 350 securely connects to cloud services by means of network tunnels.

§ 8.0 DIGITAL EXPERIENCE MONITORING

Figure 8:
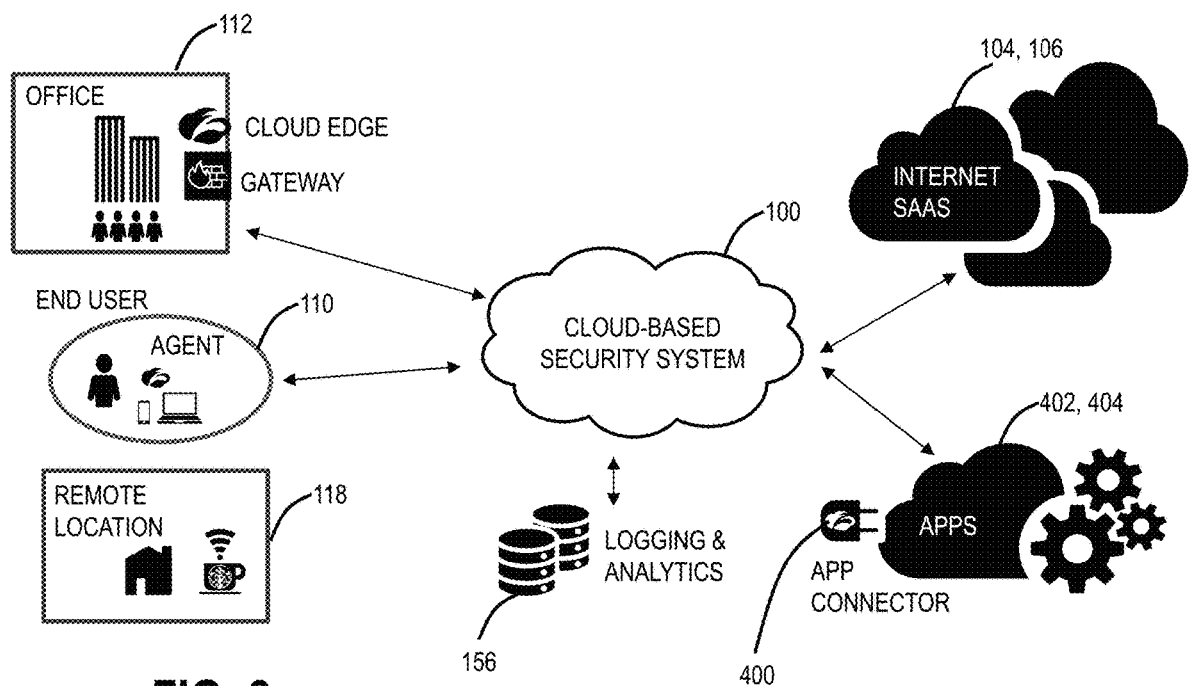
FIG. 8 is a network diagram of the cloud-based system of FIGS. 1 and 2 in an application of digital experience monitoring.

FIG. 8 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.)

and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 8.1 Digital Experience Monitoring

The applications 402, 404 and the SaaS can include enterprise applications, Office 365, Salesforce, Skype, internal applications, etc. These are critical business applications where user experience is important. The objective here is to collect various data points so that user experience can be quantified for a particular user, at a particular time, for purposes of analyzing the experience as well as improving the experience.

In an embodiment, the monitored data can be from different categories including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
|---|---|
| System details | Network (config) |
| Central Processing Unit (CPU) | Disk |
| Memory (RAM) | Processes |
| Network (interfaces) | Applications |

An example of HTTP Request metrics includes CONNECT, time to first byte/first bytes, time to last byte, Secure Sockets Layer (SSL) handshake time, etc. For example, HTTP can be used to send probes to take measurements as described in commonly-assigned U.S. patent application Ser. No. 16/043,250, filed Jun. 24, 2018, and entitled "Cloud services management systems utilizing in-band communication conveying situational awareness," the contents of which are incorporated by reference herein.

For example, browser triggered data can include collection when a user visits a domain or subnet. The page load performance data can be sampled using the W3C standard HTTP Archive format (HAR). For each session or sample, the agent application 350 can collect: a device fingerprint profile including: 1) IP/DNS configuration (private/public IP, gateway, etc.), 2) Wired or Wi-fi connection (link speed, signal quality, Service Set Identifier (SSID), Basic SSID (BSSID), etc.), 3) VPN config if possible (from routing table, VPN service), 4) Proxy config (cloud or other, parse Proxy Auto Config (PAC) files), and 5) System metrics (CPU, Mem, Swap, bytes in/out etc.). The device fingerprint profile can also include test probes such as a Ping (Internet Control Message Protocol (ICMP)) to discovered gateway, destination, VPN and/or Proxy, and Traceroute (ICMP/Transmission Control Protocol (TCP)) to discovered gateway, destination, VPN and/or Proxy.

Metrics could be combined. For example, device health can be based on a combination of CPU, memory, etc. Network health could be a combination of Wi-Fi/LAN connection health, latency, etc. Application heath could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in context of an inline transaction by the application 350 or cloud edge. The metrics can be tagged with metadata (user, time, app, etc.) and sent to the logging and analytics service for aggregation, analysis and reporting.

The synthetic measurements can include probes from the agent application 350, the lightweight connector 400, etc. The probes can include HTTP/HTTPS probes, network probes, Voice over IP (VoIP) related probes (e.g., Session Initiation Protocol (SIP), Real Time Protocol (RTP), etc.), DNS probes, Proxy probes, etc. The HTTP/HTTPS probes can configure the URL and interval where the probe is run—it is undesirable to have every device running tests. This can include a configured timeout, website authentication (basic, cert, NTLM), HTTP method (POST, GET, etc), SSL, custom headers, and a configured expected HTTP status code, content (string or Regex).

Due to the inline nature and the fact the cloud-based system 100 is an overlay (in-between users and services/applications), the cloud-based system 100 enables the ability to continuously capture user experience metric data and to historically log such data in the logging and analytics 804 service. As such, a network administrator can have a long-term detailed view of the network and associated user experience.

§ 8.2 Process for Digital Experience Monitoring

Figure 9:
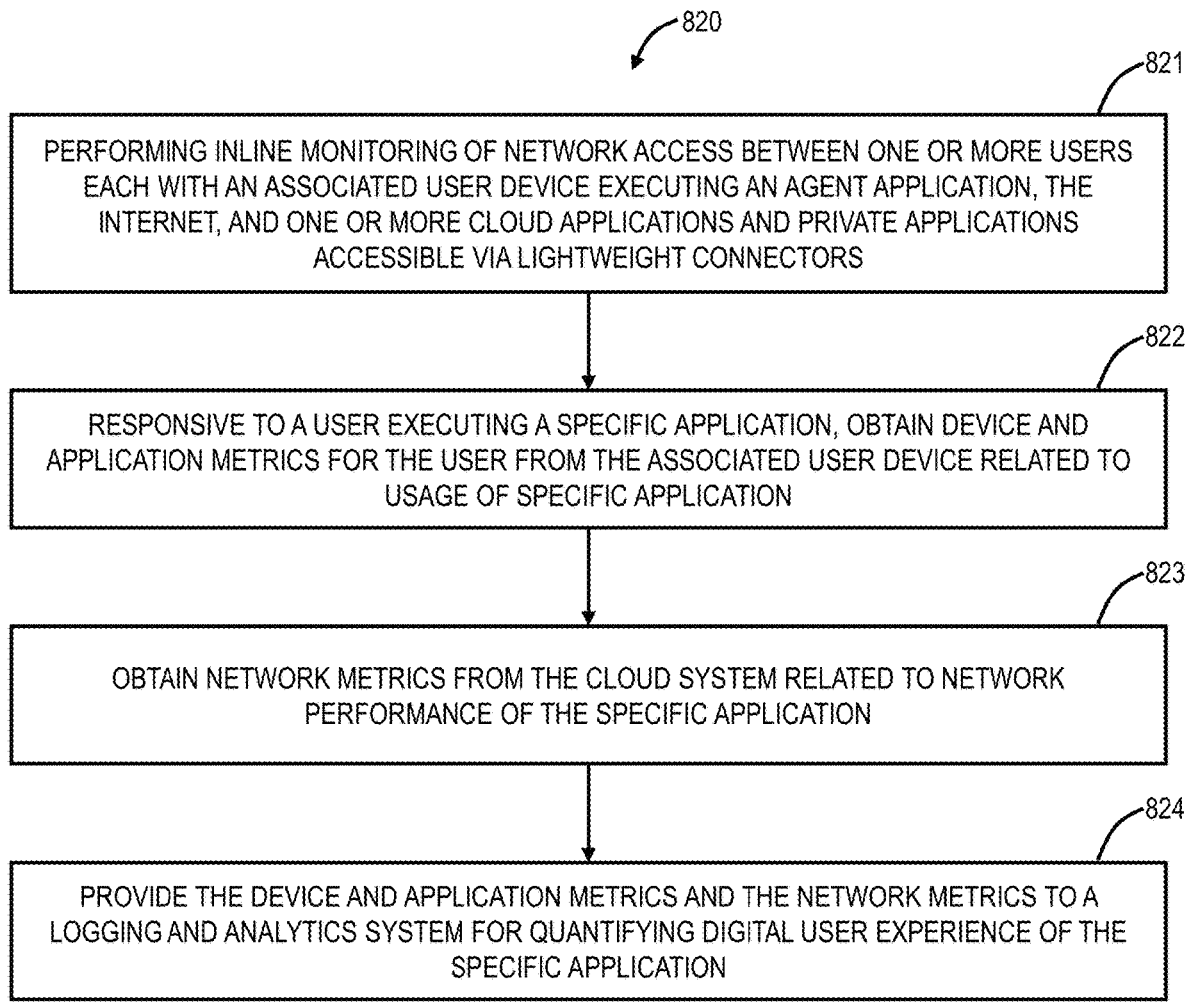
FIG. 9 is a flowchart of a process for digital experience monitoring utilizing the cloud system of FIG. 8.

FIG. 9 is a flowchart of a process 820 for digital experience monitoring utilizing the cloud-based system 100. The process 820 includes performing inline monitoring of network access between one or more users each with an associated user device executing an agent application, the Internet, and one or more cloud applications and private applications accessible via lightweight connectors (step

821); responsive to a user executing a specific application, obtaining device and application metrics for the user from the associated user device related to usage of specific application (step 822); obtaining network metrics from the cloud system related to network performance of the specific application (step 823); and providing the device and application metrics and the network metrics to a logging and analytics system for quantifying digital user experience of the specific application (step 824).

The process 820 can further include tagging the device and application metrics and the network metrics with metadata for the logging and analytics system to aggregate, analyze, and report. The process 820 can further include obtaining private application metrics related to performance of the private application via the lightweight connector. The agent application can be configured to detect the specific application and cause metric generation based thereon. The cloud system can be a distributed security system with the inline monitoring of all traffic associated with the one or more users such that the cloud system is an overlay network. The process 820 can further enrich the inline monitoring by performing periodic synthetic measurements with inline monitored traffic context between the one or more users, the Internet, and the one or more cloud applications and private applications.

§ 8.3 Digital Experience Analyzing

With the various device, application, and network-related metrics, such as in the logging and analytics 804, it is possible to aggregate these metrics to provide a User Experience (UEX) score. The UEX score can be based on the metrics collected by the application 350, the cloud edge, the cloud-based system 100, the lightweight connectors 400, etc. The UEX score captures the digital experience and can be based on a given application with associated device, application, and network-related metrics. For example, the UEX score can be determined based on some weighted combination of the device, application, and network-related metrics for a given application and the UEX score can be normalized within a range, e.g., 0 to 100. Again, the given application can be a core business critical application where UEX is important (e.g., Office365, Salesforce, Internal Inventory app, etc.) or any other designated application. The UEX scores can be determined at fixed time epochs (e.g., 15 minute increments, hour increments, etc.) and normalized. Scores can be aggregated for a group of users (e.g. department, location) or for the whole organization. Administrators are provided UEX score reports over time based on user, department, locations, etc. via a Graphical User Interface (GUI). Drilldown reporting capabilities via the GUI allow administrators to identify where there is a problem. For example, administrators can set alerts when a UEX score falls below a threshold. UEX scores for common applications across organizations can be used for peer comparisons and isolating common application issues affecting multiple organizations.

Figure 10:
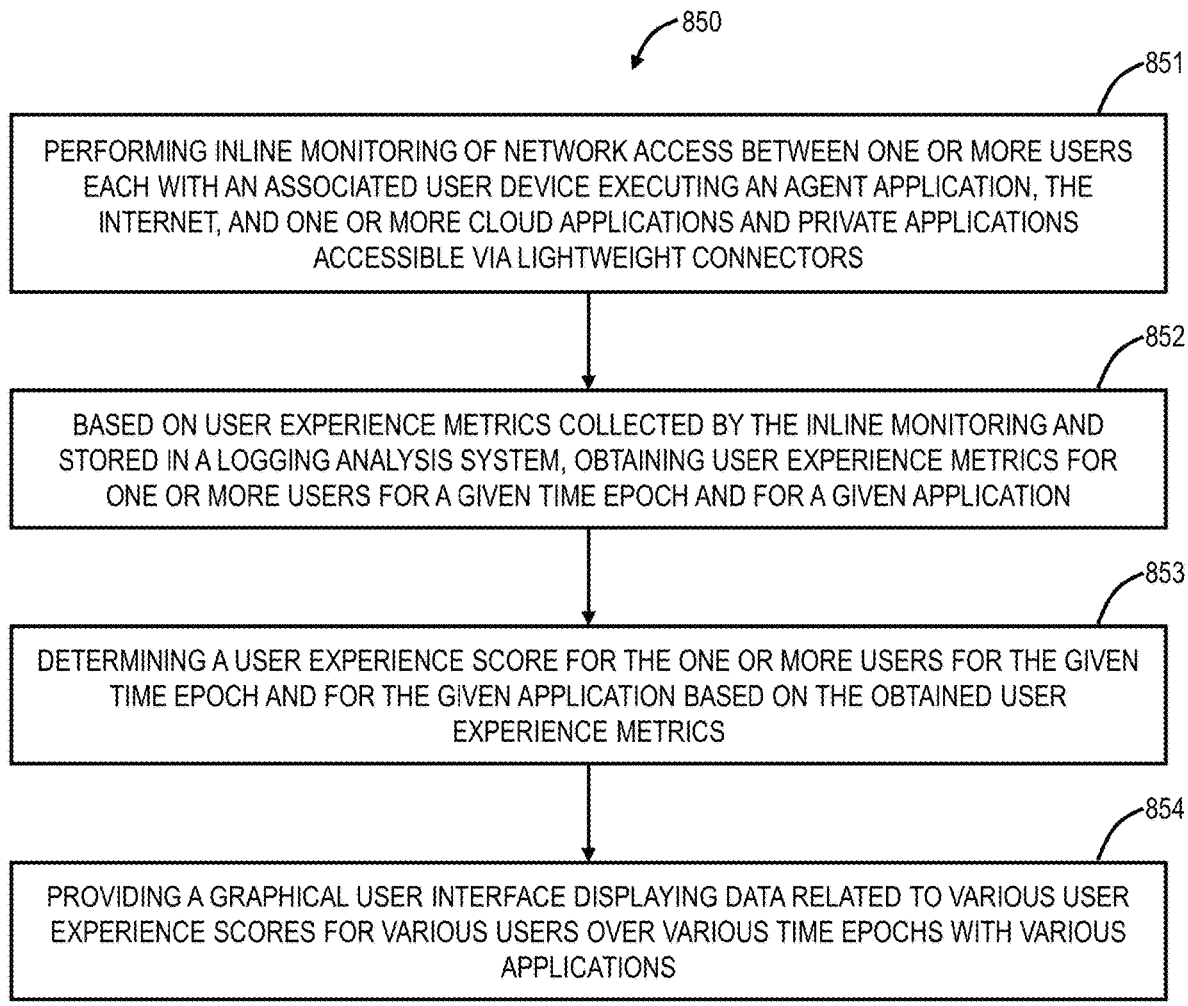
FIG. 10 is a flowchart of a process for analyzing digital user experience.

FIG. 10 is a flowchart of a process 850 for analyzing digital user experience. The process 850 includes performing inline monitoring of network access between one or more users each with an associated user device executing an agent application, the Internet, and one or more cloud applications and private applications accessible via lightweight connectors (step 851); based on user experience metrics collected by the inline monitoring and stored in a logging analysis system, obtaining user experience metrics for one or more users for a given time epoch and for a given application (step 852); determining a user experience score for the one or more users for the given time epoch and for the given application based on the obtained user experience metrics (step 853); and providing a graphical user interface displaying data related to various user experience scores for various users over various time epochs with various applications (step 854).

The process 850 can further include generating and displaying an alert responsive to any user, group of users, location, and organization's user experience score falling below a threshold for a particular time epoch. The process 850 can further include aggregating the user experience for users into groups of users, locations, and organizations, and providing a graphical user interface displaying data related to the groups of users, the locations, and the organizations. The user experience score captures digital experience and is based on a given application with associated device, application, and network-related metrics. The user experience score can be utilized for a specific application for peer comparison, and the process 850 can further include displaying associated user experience scores for the specific application for any users, group of users, locations, and organizations for comparison, and updating the display based on input while a user performs a drill down to remediate poor user experience scores. The process 850 can further include provide additional data including metrics based on input from a user in the graphical user interface.

The various metrics are collected from multiple sources and correlated in the logging and analytics 804 service to come up with a composite UEX score. Again, the sources of the metrics can include application HTTP/S traffic, browser page load times or app specific metrics provide by app vendors APIs/logs; network measurements provided by traceroute tools such as MTR; User Device system metrics (CPU, memory, etc.); cloud tunnel metrics to provide network hops trace between user device and an enforcement node 150 (inside tunnel); lightweight tunnels, etc.

Again, the UEX score is determined in the context of a specific application. For example, a computation can include a point system, e.g., 0-10 (10 being the worst). The points can be allocated based on where the user falls within a percentile threshold (e.g., p80), p100 being the worst UEX. Metrics can be weighted, e.g., Latency=4 pts., % CPU=1 pts. For an application and location, calculate average score based on users that are using the application at the location. The overall score is computed based on average UEX score across all users. For example, in the score card below on scale of 0 (best)-10 (worst), John's score is 2.5 (or 75/100).

| Salesforce.com: threshold p80 | | | |
|---|---|---|---|
| John Doe | User Percentile | Points | Earned |
| Pageload | p90 | 4 | 2 |
| Latency | p70 | 3 | 0 |
| % CPU | Median | 1 | 0 |
| Metric X | p85 | 2 | 0.5 |
| | Total | 10 | 2.5 <= UEX |

§ 8.4 Digital Experience GUI

Figure 13:
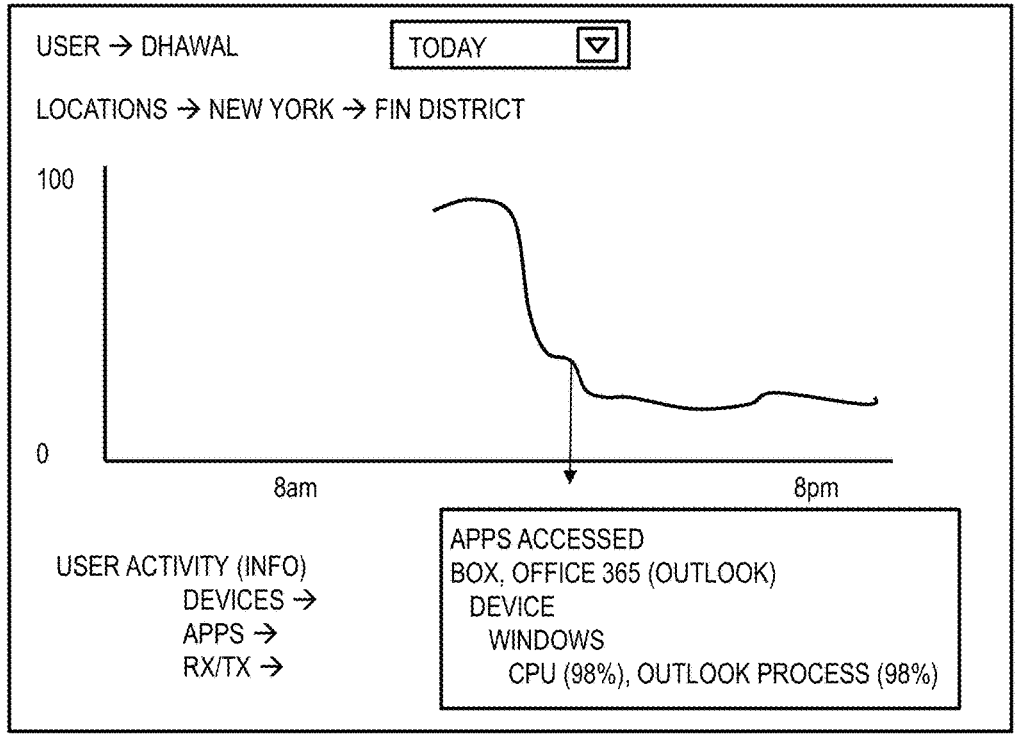
Figure 14:
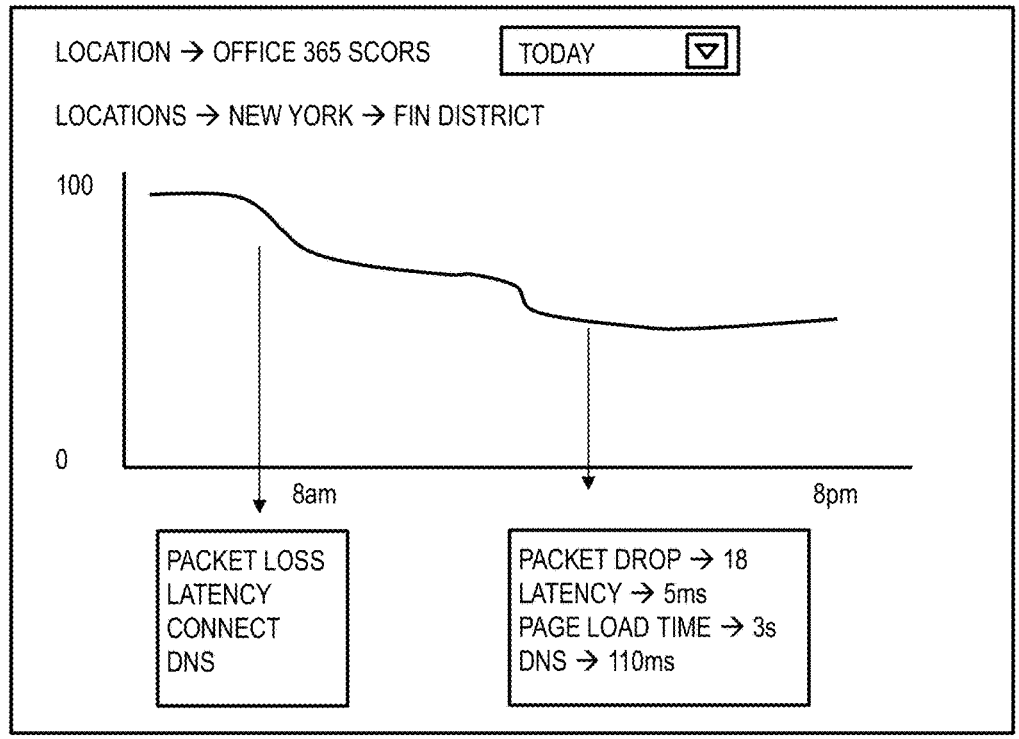

FIGS. 11-24 are various screenshots of a Graphical User Interface (GUI) associated with the analysis service to display, report, and provide a drill down of the User Experience (UEX) scores. FIG. 11 illustrates a GUI listing locations broken down showing an average score of all users at a location. FIG. 12 illustrates a GUI listing a specific location showing users, their UEX scores, a change in UEX score (e.g., over given time epochs), and impacted applications. FIG. 13 illustrates a graph of a specific user's UEX score over time. FIG. 14 illustrates a graph of a specific location's aggregate UEX score over time. Note, a user can drill down on the graph to display data at particular times when the score is low for troubleshooting.

Figure 15:
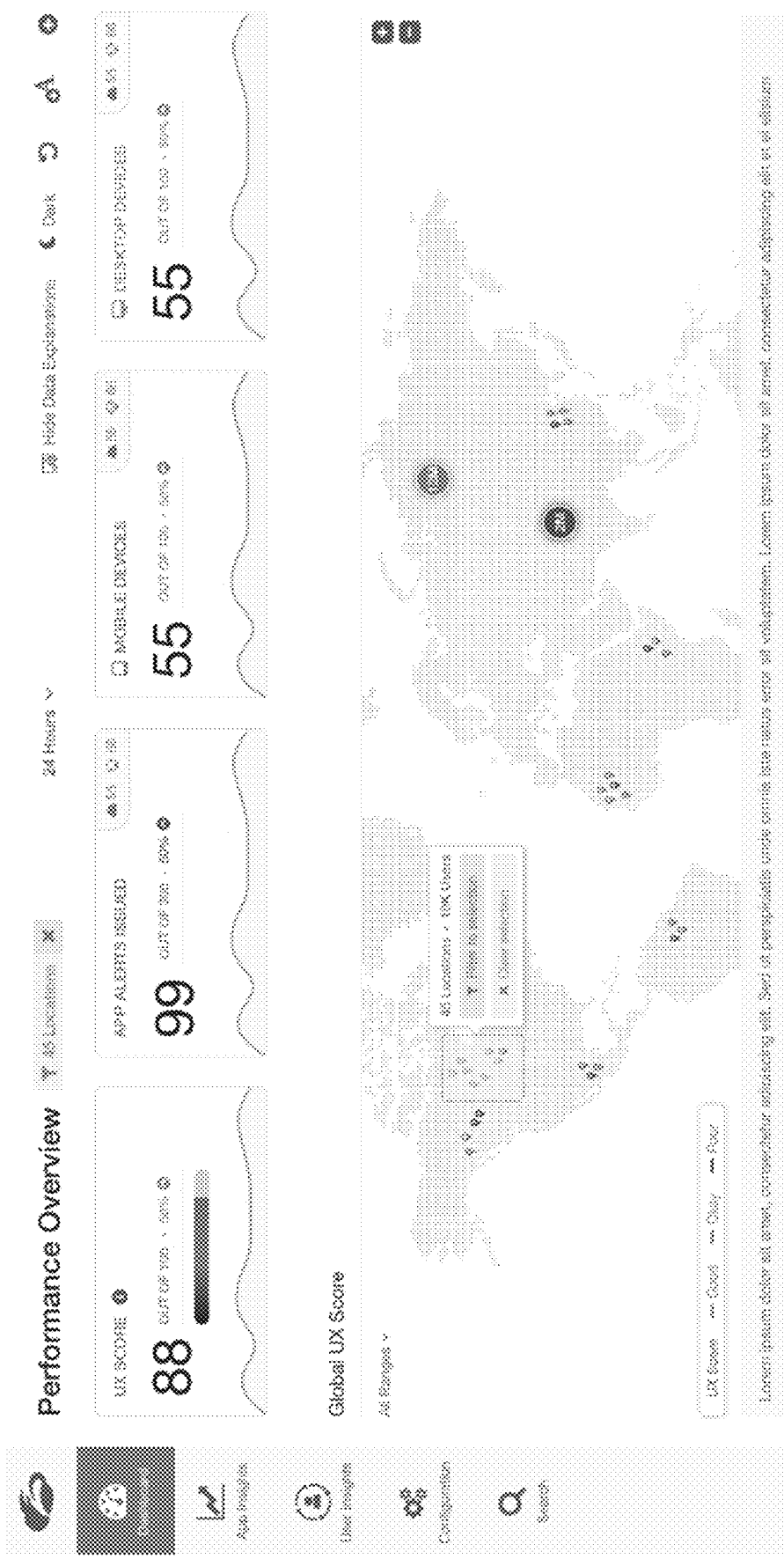

FIG. 15 is a GUI of a global dashboard for the cloud-based system 100. Here, the aggregate UEX score is displayed (all users). There is a listing of application alerts (e.g., threshold crossings), mobile devices, desktop devices, etc. A map displays the global UEX score using color codes for visual indication of locations with good, okay, and poor UEX scores. Again, this visualization can be used for drill down and remediation.

Figure 16:
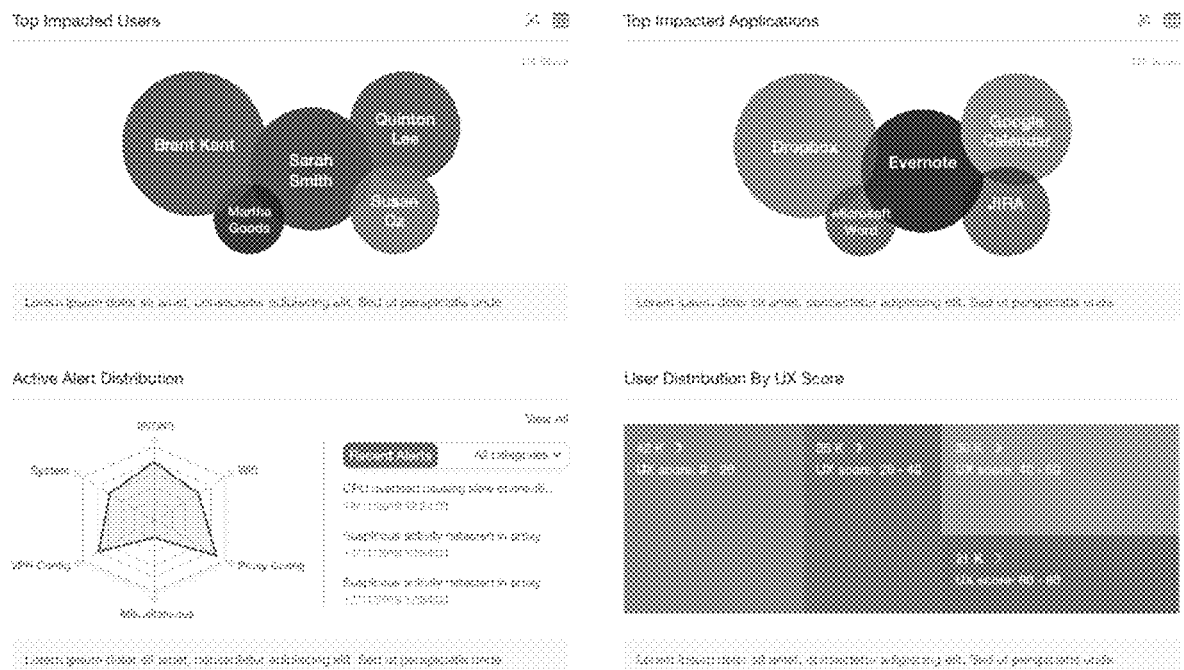
Figure 17:
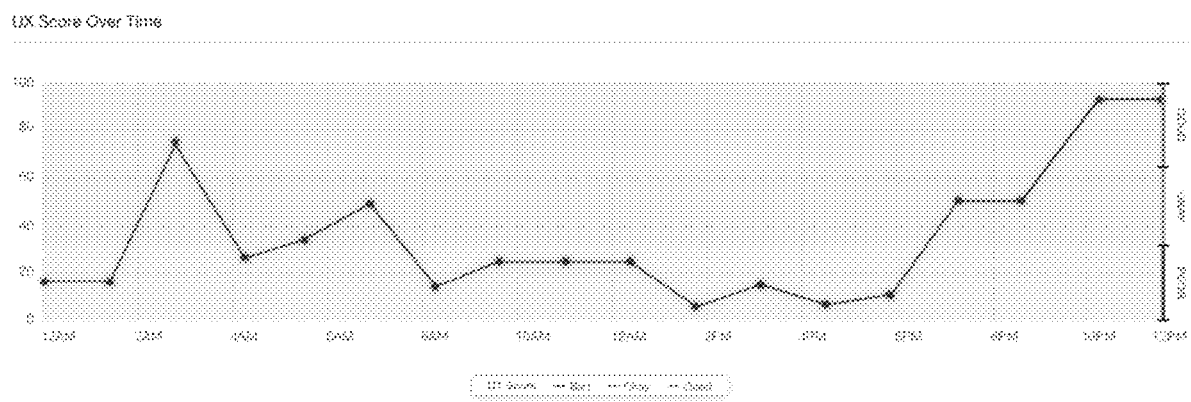
Figure 18:
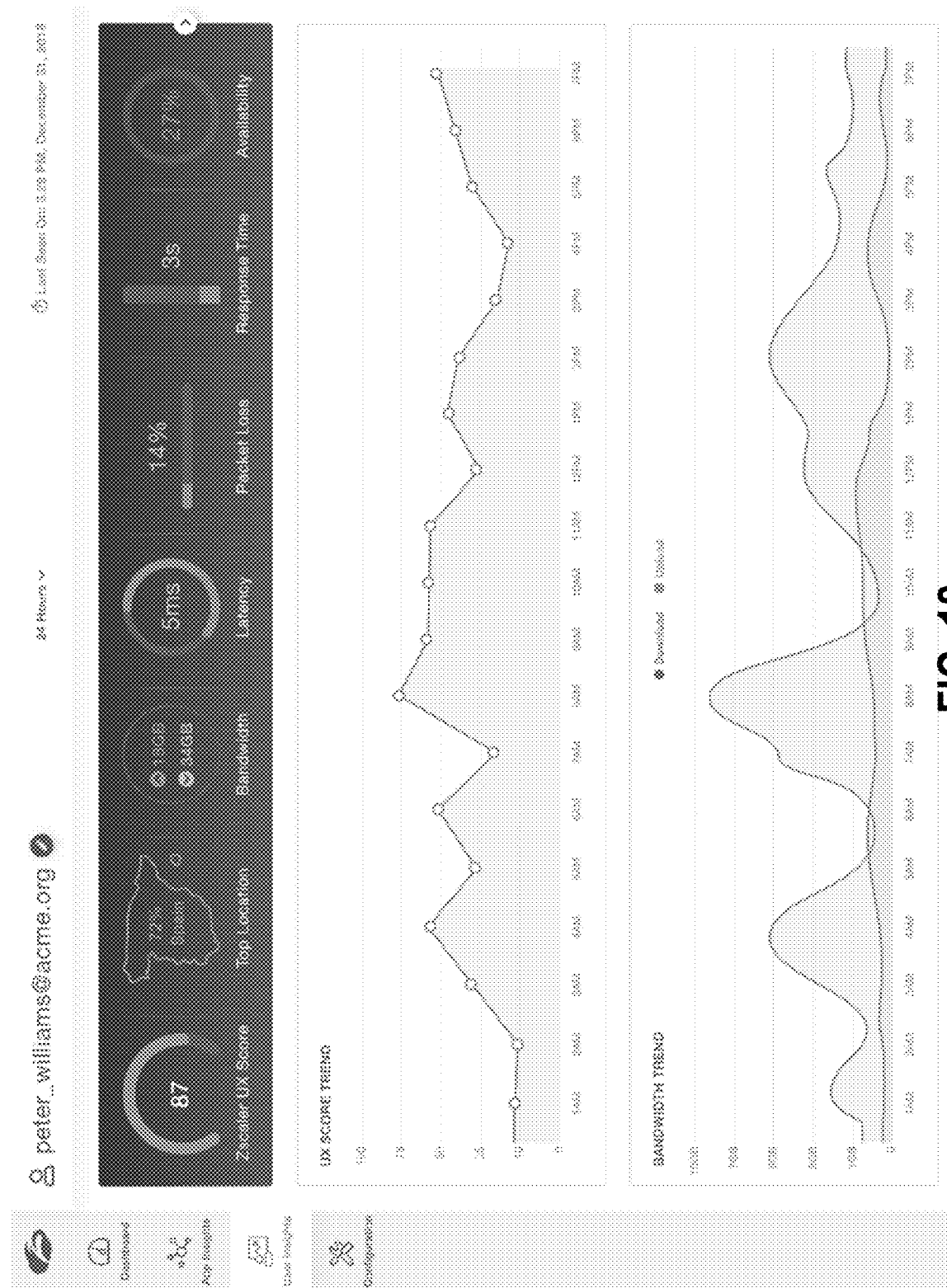
Figure 19:
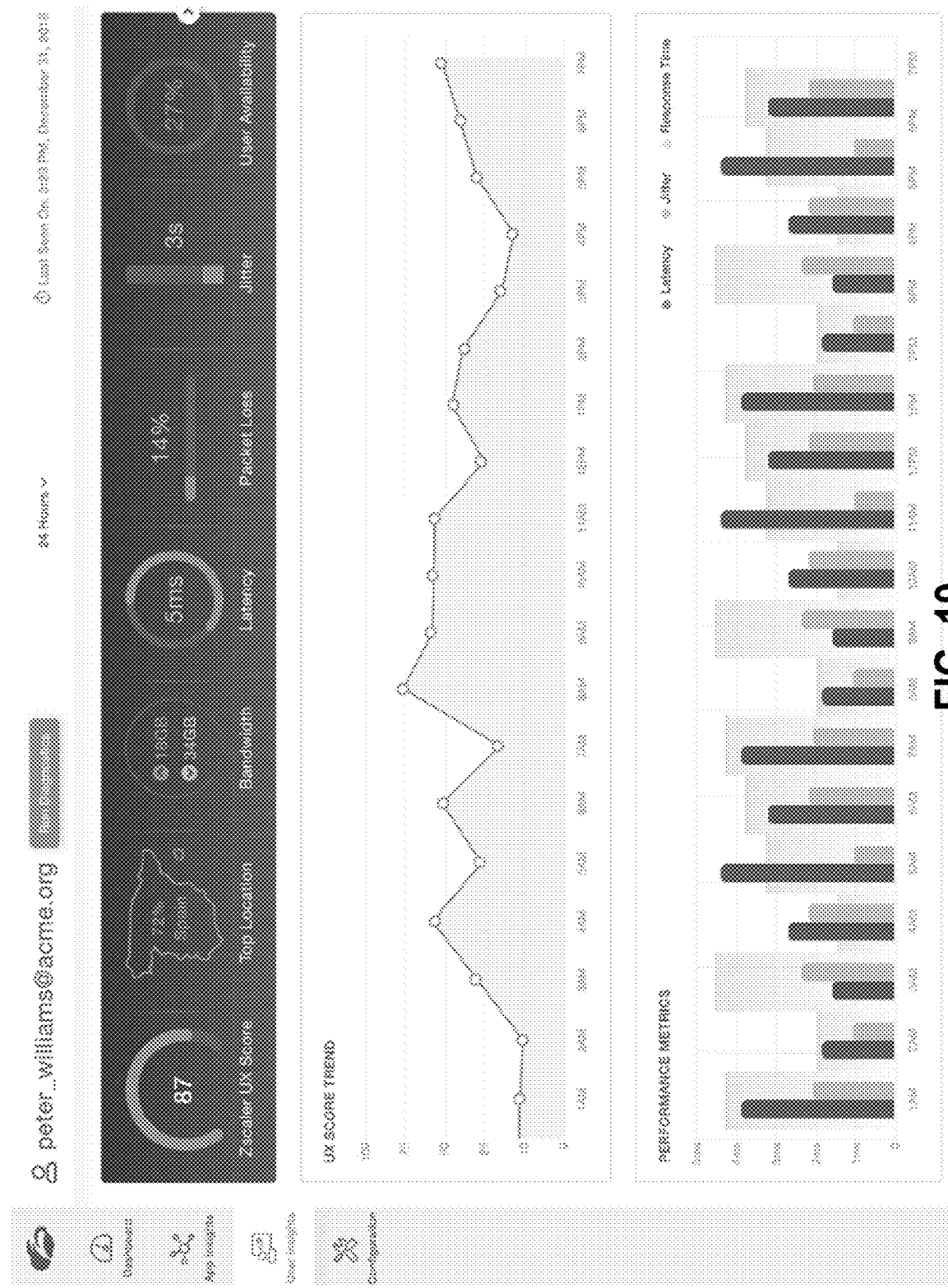

FIG. 16 is a GUI of times in the global dashboard displaying top impacted users, top impacted applications, active alert distribution, and user distribution by UEX score. FIG. 17 is a GUI of a graph of UEX score over time. FIGS. 18 and 19 are a GUI of a dashboard for an individual user. Specifically, the UEX score, location, bandwidth, latency, packet loss, response time, and availability are displayed as are graphs of the UEX score over time and bandwidth for the user in FIG. 18. FIG. 19 includes a graph of various performance metrics over time. Note, the lower performance metrics correlate to lower UEX score.

Figure 20:
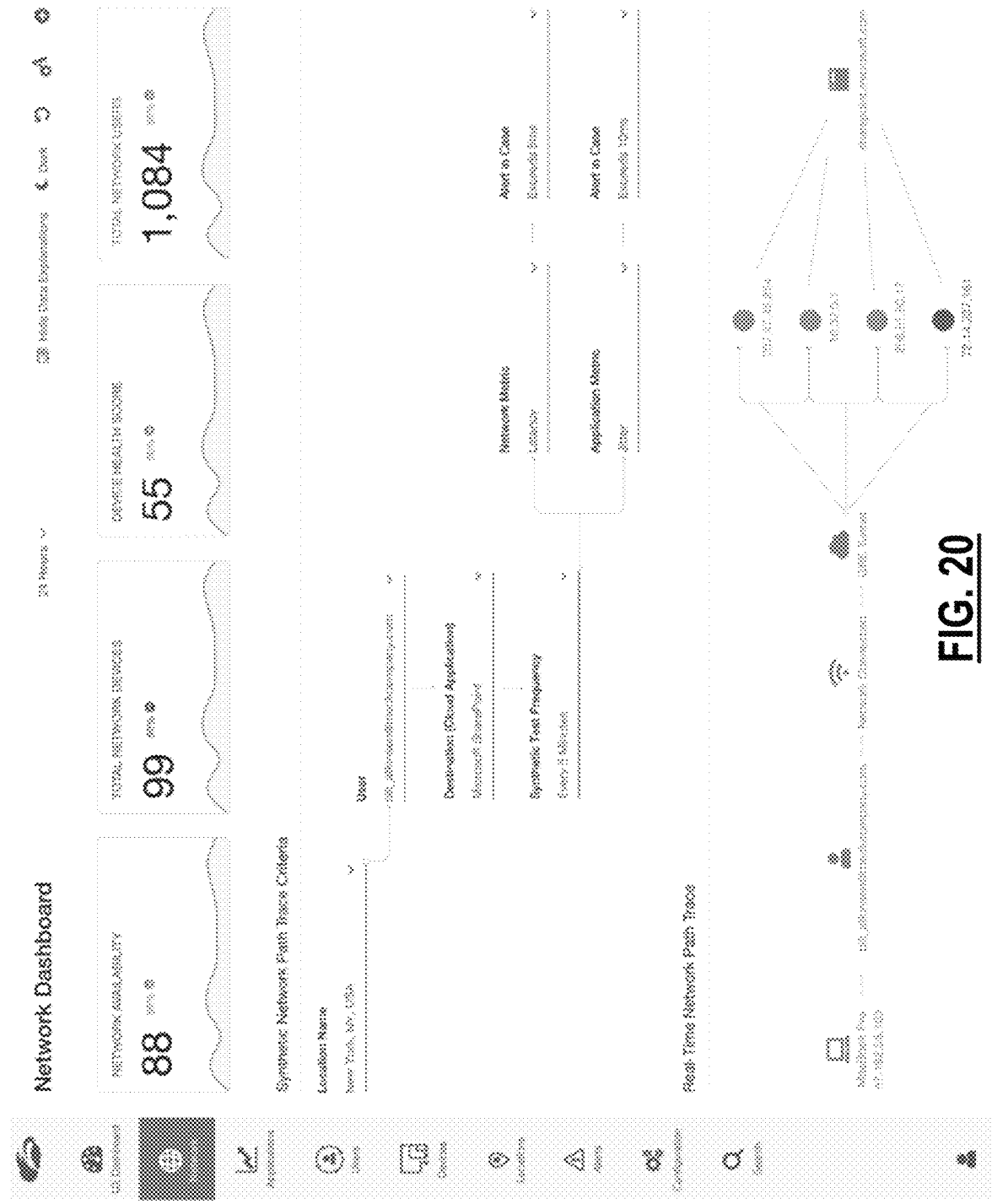

FIG. 20 is a GUI of a network dashboard. This provides a network availability metric similar to the UEX score, a total number of network devices, network device health score which can be similar to the UEX score providing a view of the average network device health, and a total network users. The network dashboard can also include a network path trace criteria which specifies endpoints, destination, users, frequency, metrics, and threshold criteria ("alert in case"). Also, the network dashboard can include a real-time path trace view that illustrates a selected user to a selected application where real-time monitoring occurs which specifies endpoints, destination, users, frequency, metrics, and threshold criteria ("alert in case"). For example, the availability metric can be 100% is GREEN, <100% is RED, Response Time: >5 sec is RED, 3-5 sec is AMBER, <3 sec is GREEN.

Figure 21:
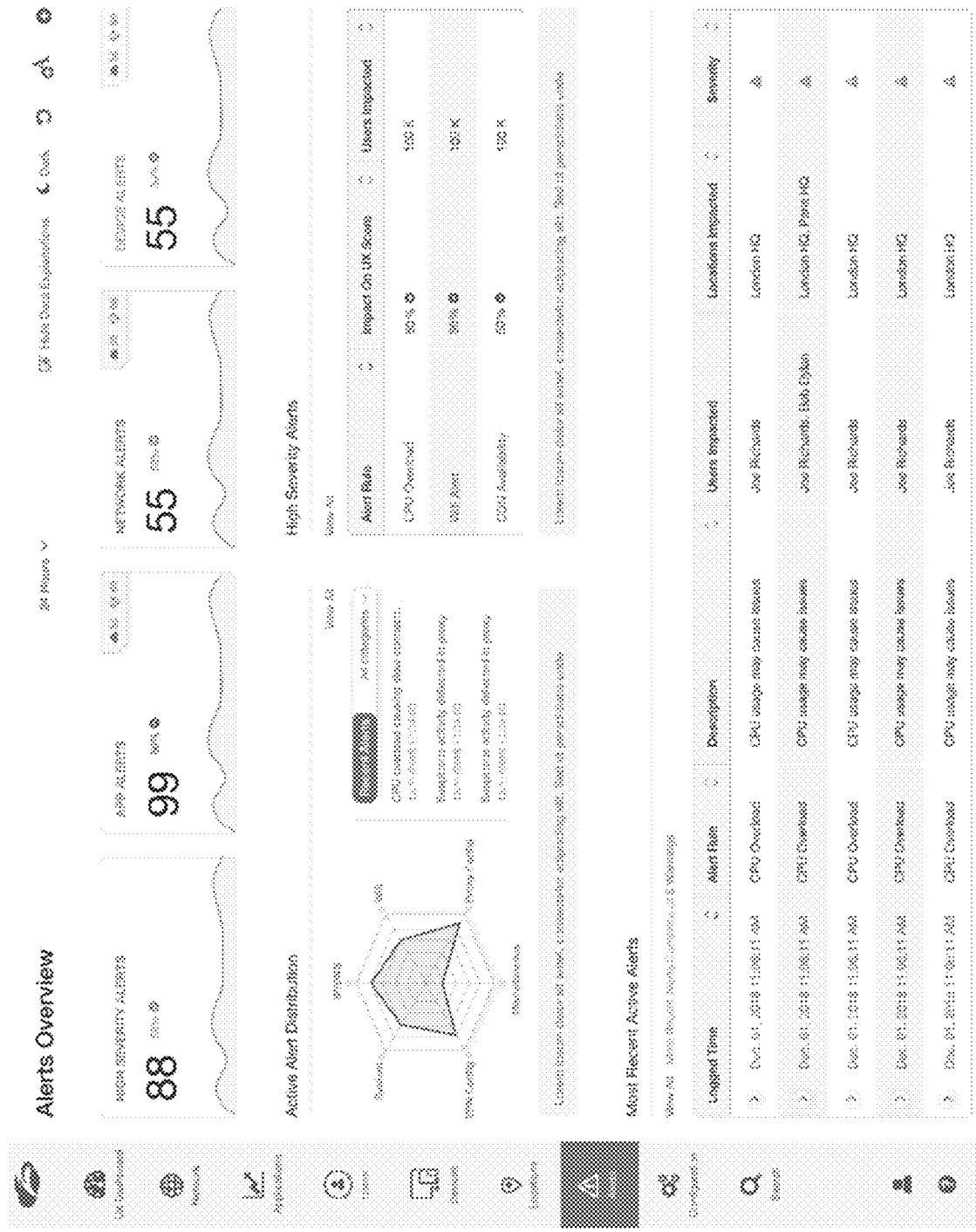
Figure 22:
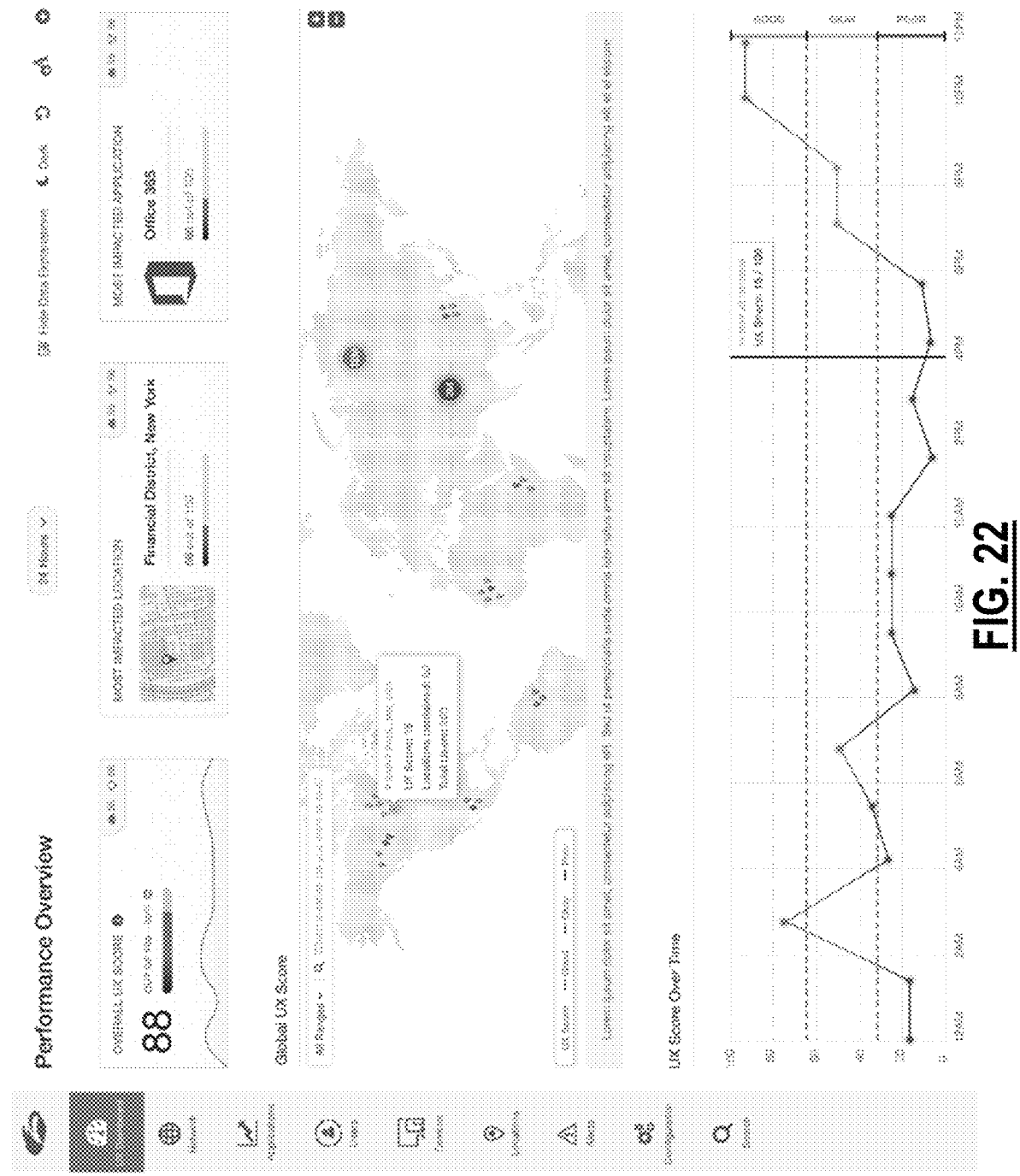
Figure 23:
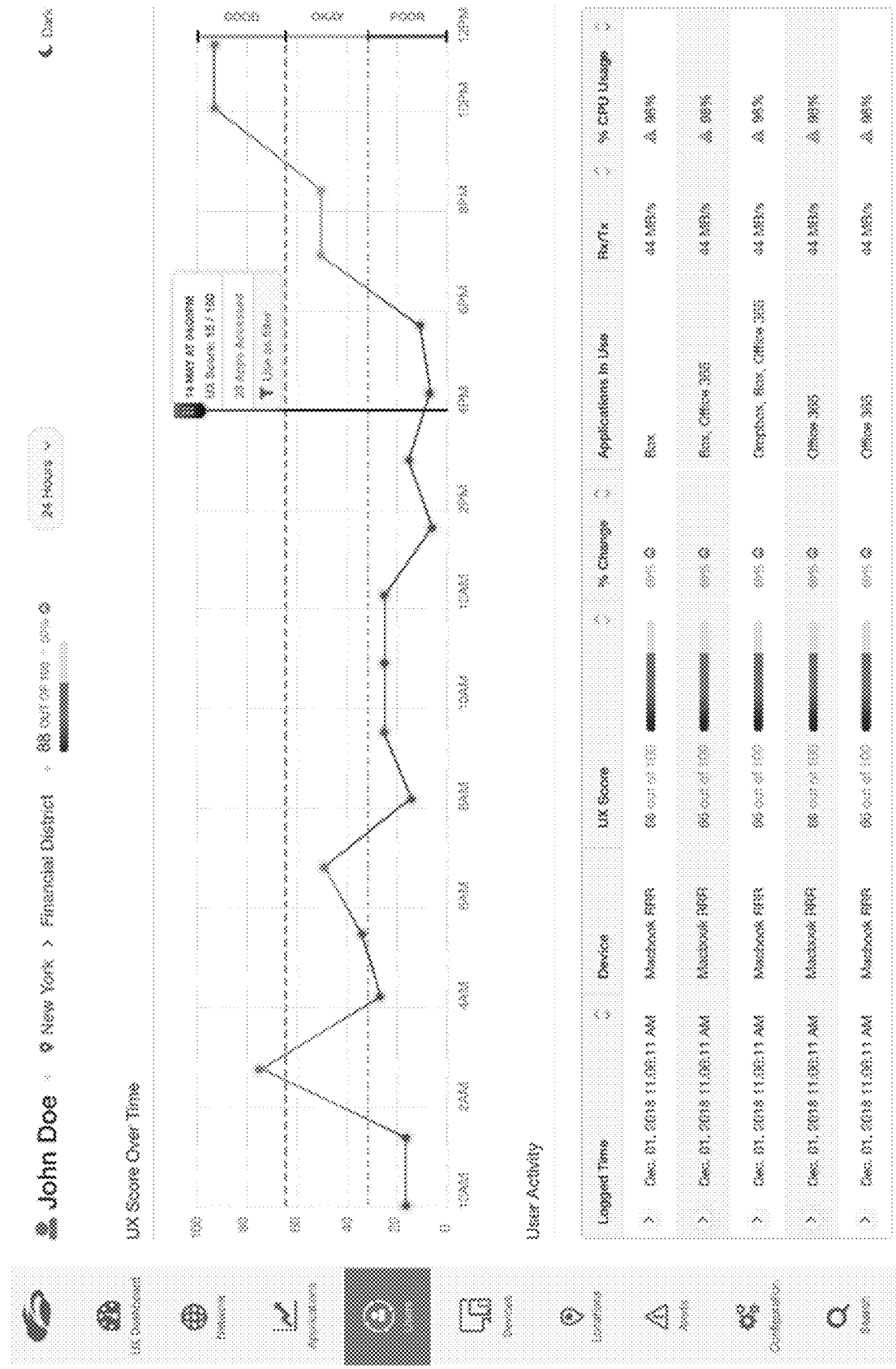
Figure 24:

FIG. 21 is a GUI of an alerts dashboard. This includes a number of high severity alerts and a number of application, network, and device alerts. The alerts dashboard further includes a visualization of active alert distribution, a listing of high severity alerts, and a list of the most recent active alerts. FIG. 22 is a GUI of a performance dashboard. This includes the overall UEX score, an indication of the most impacted location and application, a map of global UEX score, and a graph of UEX score over time. FIG. 23 is a GUI of a user dashboard illustrating a single user. FIG. 24 is a GUI of an application dashboard illustrating a single application.

§ 8.5 Improving Digital Experience

With digital user experience monitored and analyzed, it is possible to improve digital user experience in the cloud-based system 100, in real-time. The objective here is to take the monitored metrics and analyzed UEX score and use it for actionable insights that can improve operation of the cloud-based system 100 for the purpose of improving the UEX scores, i.e., remedial actions. Here, an analytics service can operate in conjunction with the monitoring service and the analysis service to provide updates to improve the UEX scores in the cloud-based system 100. For example, these services (the monitoring service, the analysis service, and the analytics service) can operate in the cloud-based system 100 as one or combined services.

The analytics service can include an Artificial Intelligence (AI)/Machine Learning (ML) anomaly detection engine that can isolate common factors affecting the UEX score. For example, Wi-Fi network coverage could be poor in a location, DNS resolution could be taking too long, there could be network congestion between two Internet Service Provider (ISP) peering points, authentication for an application could be taking an abnormally long time, etc. With the logging and analytics 804, it is possible to review historical data to train the AI/ML anomaly detection engine for ongoing detection.

The analytics service can provide policy based actions to be taken based on the UEX score by the cloud service 802 and/or the organization's IT. For integration with the organization's IT, examples include i) if UEX score falls below threshold, open service ticket with detailed metrics and reports captured, ii) enable granular analysis with packet captures on application 350 based on certain conditions, iii) change tunnel from office to different cloud service providers to improve network path, iv) enable bandwidth controls to provide QoS for a business critical application, etc. Example actions that could be taken by the cloud service 802 include auto scale cloud service resources to improve a performance bottleneck, use the cloud edge to choose better network path, etc.

Figure 25:
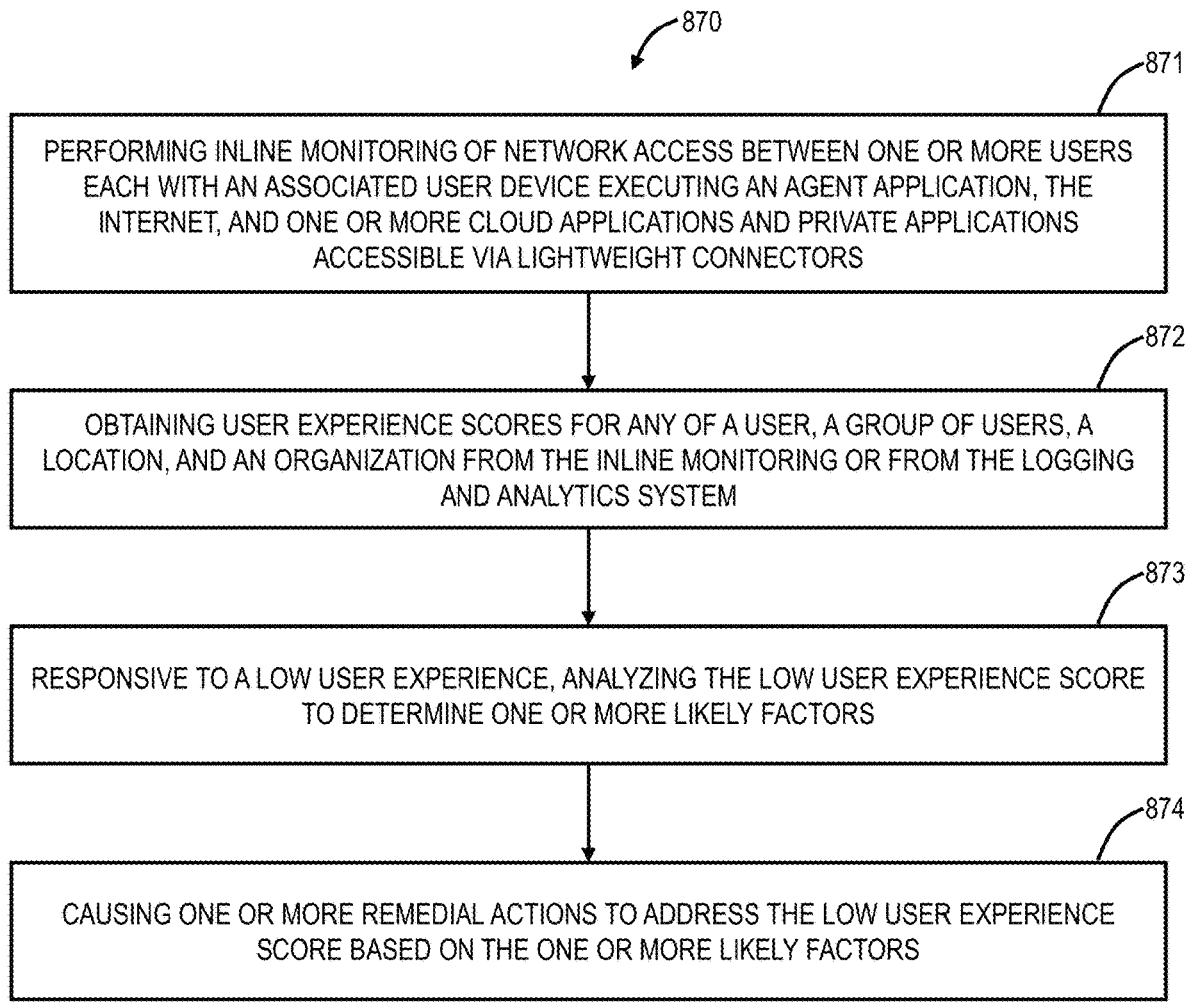
FIG. 25 is a flowchart of a process for improving digital user experience.

FIG. 25 is a flowchart of a process 870 for improving digital user experience. The process 870 includes performing inline monitoring of network access between one or more users each with an associated user device executing an agent application, the Internet, and one or more cloud applications and private applications accessible via lightweight connectors (step 871); obtaining user experience scores for any of a user, a group of users, a location, and an organization from the inline monitoring or from the logging and analytics system (step 872); responsive to a low user experience, analyzing the low user experience score to determine one or more likely factors (step 873); and causing one or more remedial actions to address the low user experience score based on the one or more likely factors (step 874).

The process 870 can further include analyzing user experience scores on one or more of an ongoing basis and a historical basis; determining likely factors in the cloud system, on the associated user device, and in the one or more cloud applications and private applications that cause low user experience scores; and utilizing the determined likely factors in analysis of the low user experience score. The process 870 can further include analyzing user experience scores on one or more of an ongoing basis and a historical basis; and utilizing the analyzed user experience scores to train a machine learning algorithm.

The one or more remedial actions include any of opening of a service ticket with detailed metrics and reports included, causing granular analysis on a user device via the agent application, changing one or more tunnels in the cloud system, and configuring bandwidth controls to adjust priority of a corresponding application. The cloud system can include a plurality of tunnels and tunnels are selected based on the user experience scores for specific users for specific applications. The user experience score captures digital experience and is based on a given application with associated device, application, and network-related metrics.

§ 8.6 Tunnels and Path Selection

As described herein, connectivity between the end user, the cloud-based system 100, the Internet, and the applications 706, 708 can be via tunnels, such as using the various protocols described herein. One aspect of remediation for poor UEX scores can include tunnel selection or switching.

Figure 26:
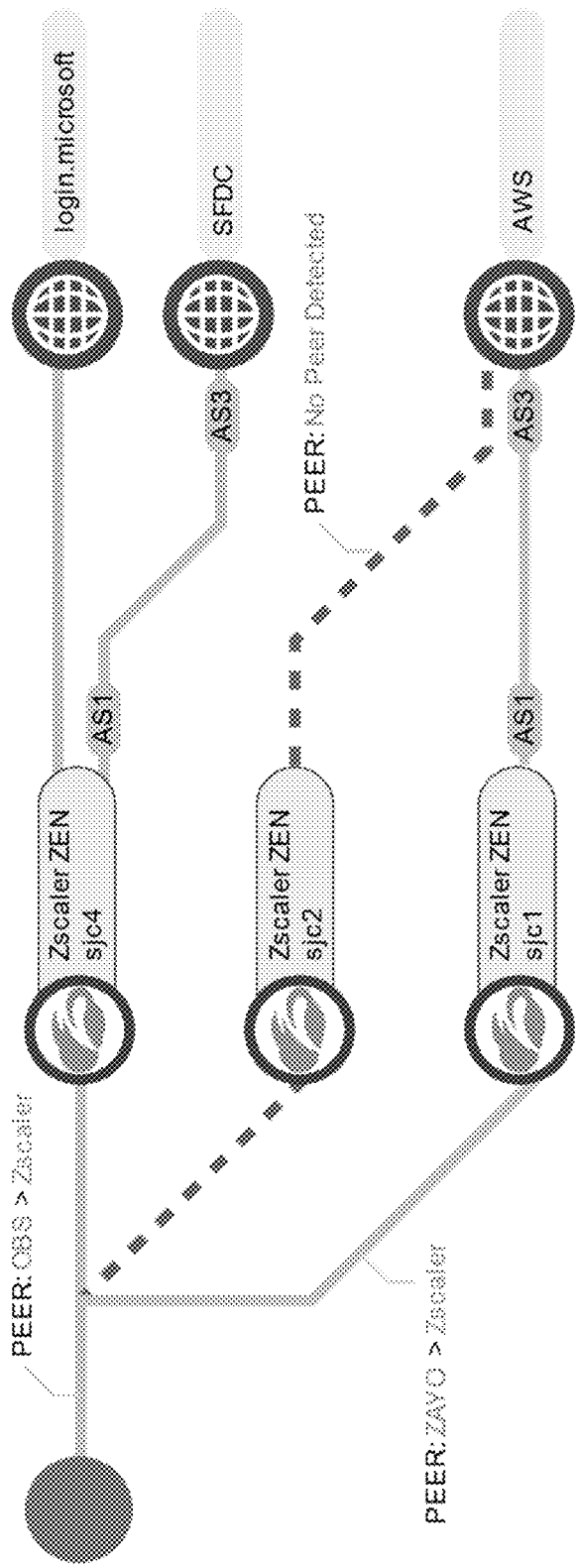
FIG. 26 is a network diagram of selecting the best path from a cloud node to a customer network.

FIG. 26 is a network diagram of selecting a best path from a cloud node to a customer network. Here, a ZEN node is any of the enforcement nodes 150. The cloud-based system 100, via the analytics service, can selected different Autonomous Systems (AS) to connect based on the user experience scores.

Figure 27:
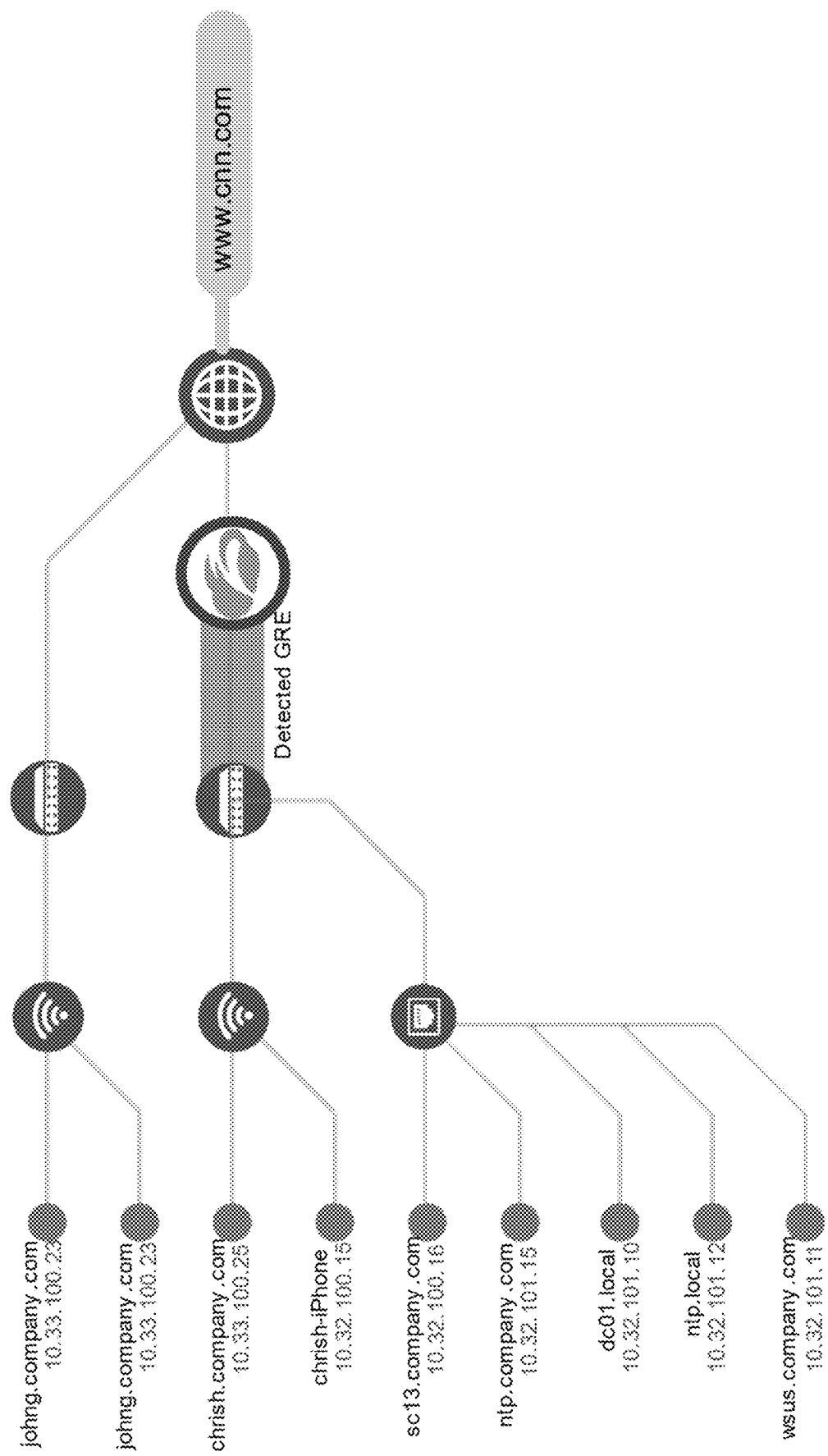
FIG. 27 is a network diagram of selecting the best path between cloud node and a user utilizing the agent application.
Figure 28:
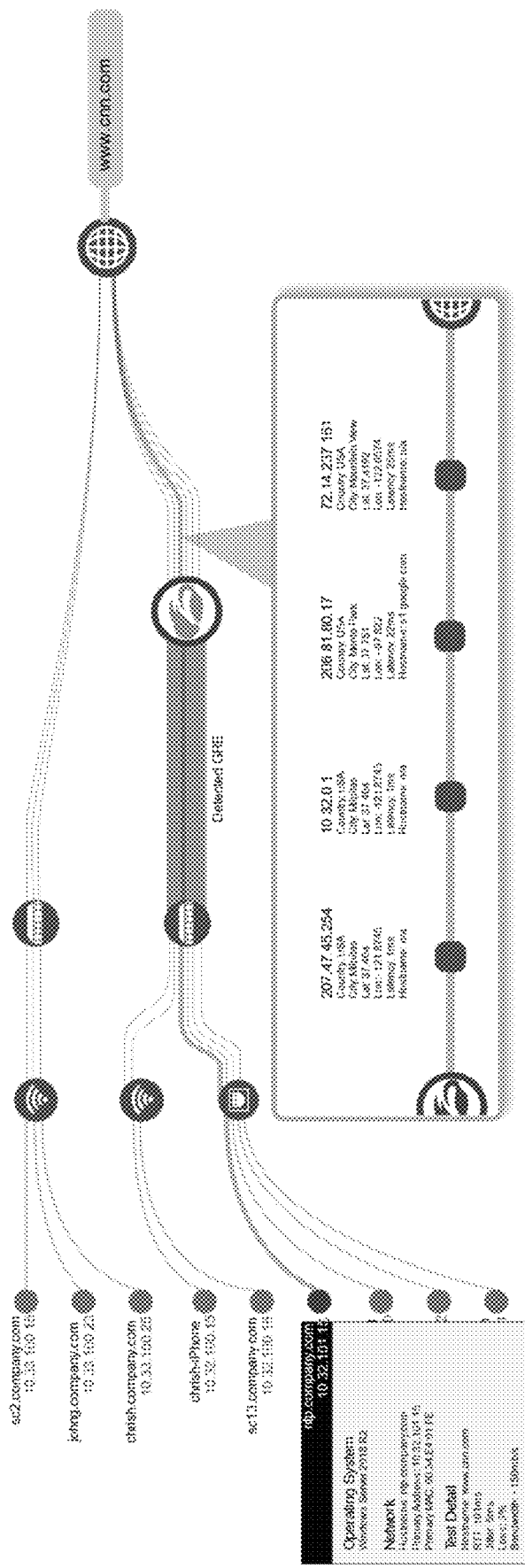
FIG. 28 is a network diagram of a detailed path analysis that is displayed in a GUI.

FIG. 27 is a network diagram of selecting a best path between cloud node and user utilizing the agent application 350. FIG. 28 is a network diagram of a detailed path analysis that is displayed in a GUI. Clicking on a segment of the flow, will open a zoomed view for that segment and a zoomed view will indicate hops and other devices in that path.

§ 8.7 Agent Application Integration and User Workflow

Figure 29:
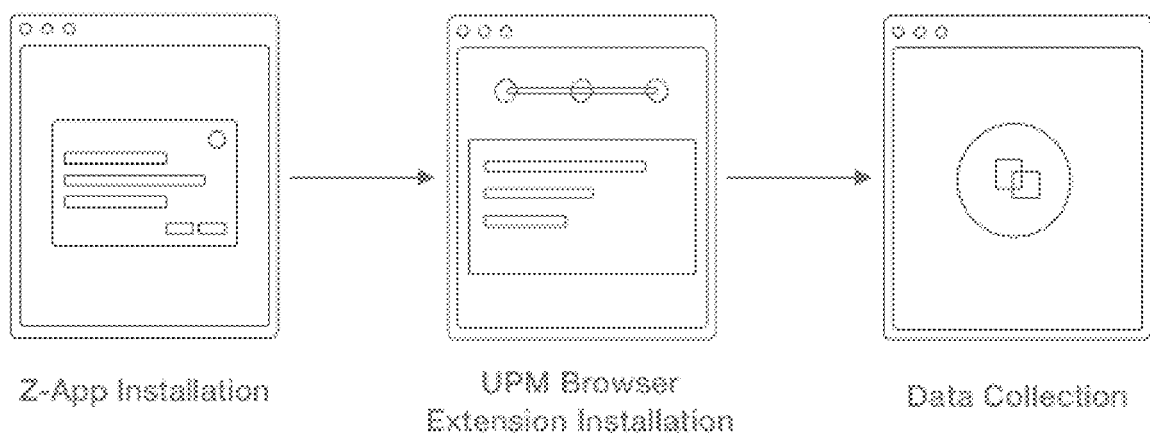
FIG. 29 is a flow diagram of a user workflow with the agent application.
Figure 30:
FIG. 30 is a screenshot of a Web browser illustrating the User Performance Monitoring (UPM) browser extension.

FIG. 29 is a flow diagram of a user workflow with the agent application 350. Here, the agent application 350 is installed, a User Performance Monitoring (UPM) browser extension can be installed, and data is collected. FIG. 30 is a screenshot of a Web browser illustrating the UPM browser extension.

§ 8.8 Administrator Workflow

Figure 31:
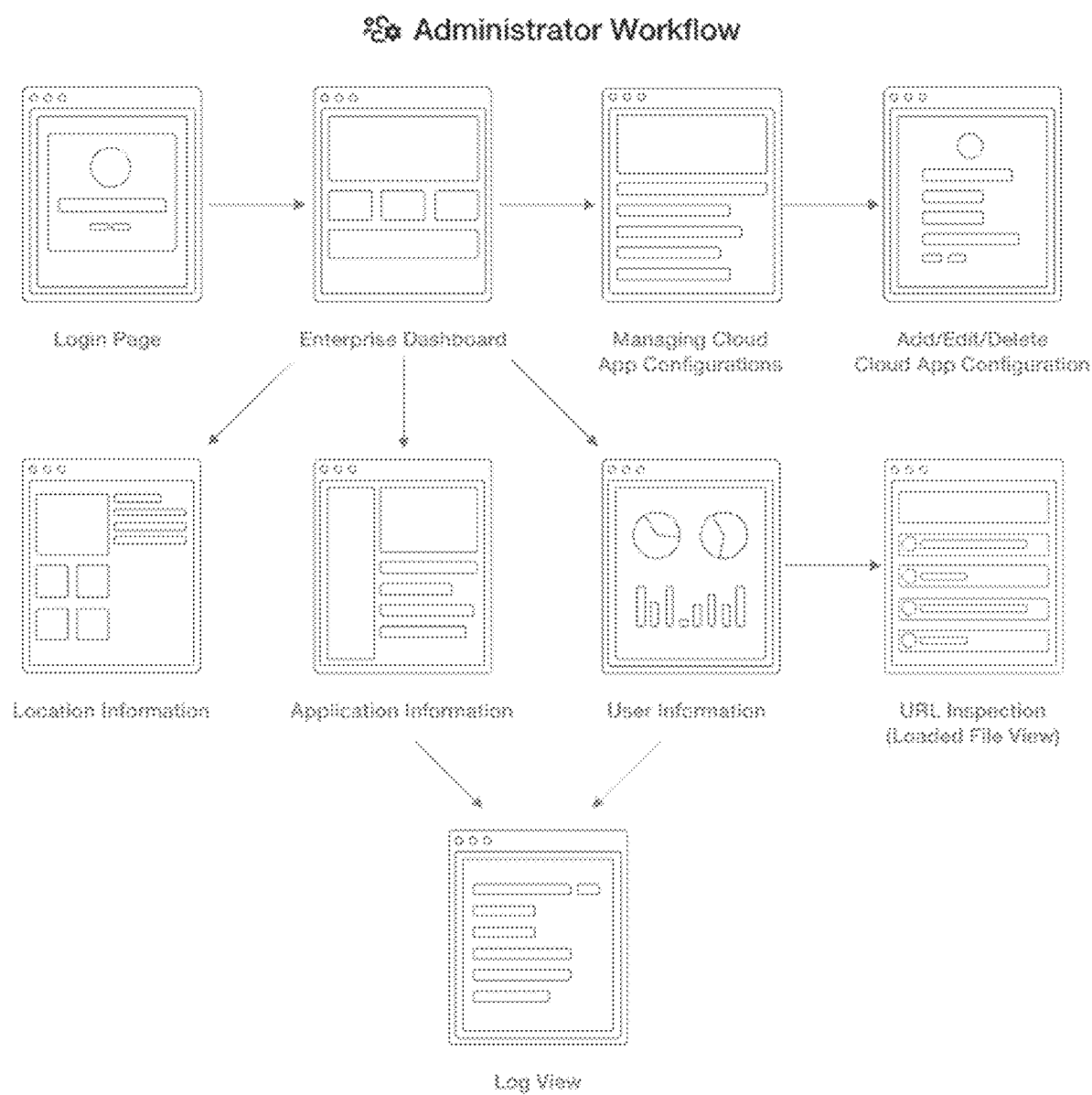
FIG. 31 is a flow diagram of an administrator workflow with the GUI.

FIG. 31 is a flow diagram of administrator workflow with the GUI.

§ 8.9 Monitoring Techniques

In an embodiment, a process includes tracing network path hops encapsulated inside a proxy tunnel by performing tracing from a client computer and routing the trace traffic data into a concentrator system where the hop data is analyzed.

In another embodiment, a process to perform synthetic network probes from end user client endpoint in context of inline real time traffic monitoring at large scale includes deploying randomization techniques to break the stride of probe traffic against a target destination, as to avoid being flagged by destination computer to be blacklisted.

In a further embodiment, a process to calculate a web page load time outside a web browser includes detecting web page document within inline network traffic, tracking all page sub requests and recording load timings for main request and sub requests then forwarding to an analytics system to reassemble the page and subpage requests timings and compute overall page time.

§ 8.10 Use Cases

A first user case can be how is the real user experience accessing key SaaS business applications? This can be determined by measuring performance from the user browser, when the user visits actual pages of key SaaS applications (ex: Office365, salesforce, workday, etc.). The UEX score can be based on page load timings, network delays, and system metrics during user session time frame. The UEX score metrics can be aggregated by geographic location and application to highlight problems based on default or pre-configured thresholds and metric trends (e.g., 90th percentile, mean) to provide an ability to share or save an interactive snapshot of the problem as part of a service escalation.

A second use case can be are there any high network latency or delays to key destinations from user devices—with and without the cloud? This can include scheduling ICMP tests to periodically measure network performance to a discrete network or application domain and reporting My Traceroute (MTR) style metrics (min/max/avg Latency, Jitter, % Loss). This can be measured with and without any proxy and used to display topology flow graph with latency at each hop, aggregate performance metrics by geographic location and application, and highlight problems based on default or pre-configured thresholds to provide an ability to share an interactive snapshot of the problem as part of a service escalation.

A third use case can include are there any high response times to my key web applications from my user devices—with and without the cloud? This can include scheduling a monitor to periodically measure HTTP/S target server response to a specific IP address or domain. This includes an ability to provide authentication login parameters and GET/POST parameters to interact with application (e.g., login, load email), an ability to produce page waterfall timings, etc. This can be measured with and without the cloud or proxy and performance metrics can be aggregated by geographic location and application to highlight problems based on default or pre-configured thresholds and metric trends.

A fourth use case can include wanting to see user device details to troubleshoot system performance and correlate with application and network metrics. This can include scheduling a monitor to periodically collect system performance metrics on the user device, aggregating performance metrics by slower devices, and overlaying user application and network performance with device performance (how's device % CPU and memory usage at time user experienced slowness?). This can highlight problems based on default or pre-configured thresholds to provide the ability to share an interactive snapshot of the problem as part of a service escalation.

§ 9.0 ALERTS FOR MONITORING AND RESPONDING TO SPECIFIC EVENTS

Again, the cloud-based system 100 has the ability to monitor, diagnose, generate alerts, and perform remedial actions with respect to network endpoints, network components, network links, etc. The alerts generated can be with regards to any aspect of the inline monitoring disclosed herein and can be based on rules establishing specific criteria and conditions that, when fulfilled, trigger the alert(s).

Alerts can be triggered when results meet a specific condition defined by an alert rule. An alert can also have an action, such as a notification of the alert, associated therewith, such that when alerts are triggered, the action is also triggered. For example, an email can be sent, webhooks can be triggered, or messages can be sent via 3rd party integrations such as Servicenow, Pagerduty, Slack, etc.

Actions can be triggered when the alert becomes active, i.e. only at the start, and can also be triggered once the alert is cleared. Further, when multiple alerts are active simultaneously, the data can be grouped into a single action/notification (such as an email) to reduce noise in the system. Alerts and actions triggered therefrom can be customizable by the user.

Any combination of rules can be established relative to the inline monitoring and the data and metrics collected therewith. For example, the rules can include one or more of the following: (1) when a UX score degrades by certain threshold percentage over a predetermined or selected period of time; and (2) any of the metrics of the inline monitoring meets a predetermined or selected threshold for the respective metric, such as a UX score, network latency (per log), percentage of packet loss (per leg), total hop count, per leg hop count, incomplete traceroutes, DNS time, Page Fetch Time, availability (HTTP errors), and device health metrics. More particularly, the rules can trigger an alert if: the overall UX score in any location is less than 70% in the past 24 hours; if there are more than 5% or 100 devices seeing a 500 error for web monitors; a particular device has not sent any data for a predetermined or selected amount of time (e.g. in the last 4 hours); a traceroute probe did not complete; a user has a predetermined or selected number of failed web monitor requests within predetermined or selected period of time, for example, 3 failed web monitor requests in 10 minutes (alerts can be throttled so that it triggers only once in an hour for failed logins from the same user); a web application has more than a predetermined or selected number of errors and/or a page fetch time greater than a predetermined or selected time more than a predetermined or selected number of times in a row; a UX score in a specific location becomes below average for that region; and a UX score within a setup geofence degrades from good to okay, such as below 66%.

Triggering events based on the alert rules can be checked in real time or can be checked on a predetermined or selected interval, for example, every five minutes. The predetermined or selected interval can be aligned and synchronized with the monitors/inline monitoring described above. In order to reduce noise by sending multiple notifications for the same or similar alerts, alert criteria can be included to limit the notifications. For example, alerts can be limited to when the alert event occurs a predetermined or selected number of times in a row, if the alert events impact a predetermined or selected number or percentage of devices in a particular location, group, department, operating system version, and the like. Furthermore, a repeating alert event can be throttled so that only one notification of the alert is sent or the alert is only triggered once. For example, if the same alert event starts/stops multiple times within 1 minute, the alert can be throttled to send only one notification.

Again, as shown in FIG. 21, an alerts dashboard can include a number of high severity alerts and a number of application, network, device alerts, a visualization of active alert distribution, a listing of high severity alerts, and a listing of the most recent active alerts, which can be available under an alerts tab.

Figure 32:
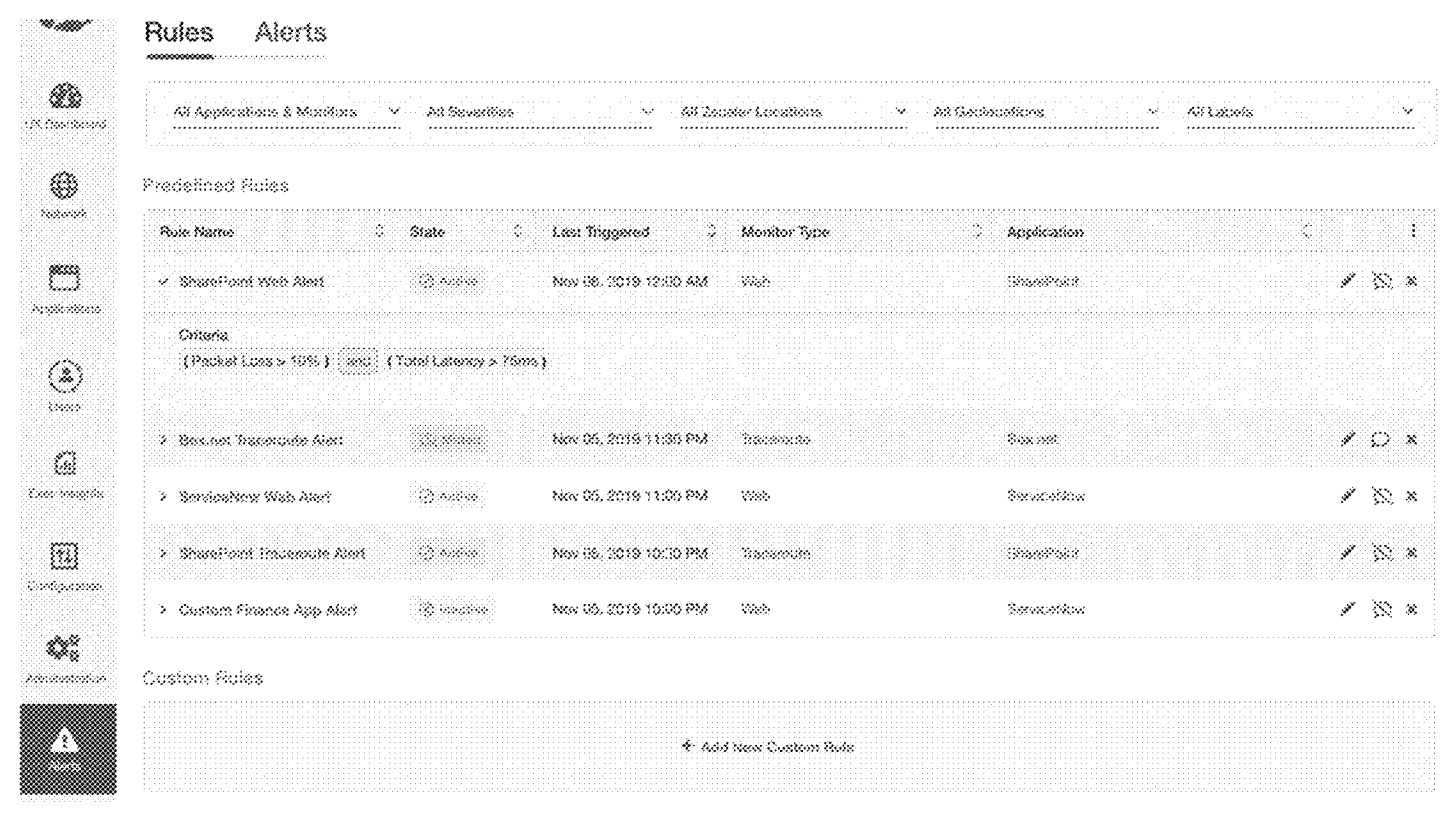

FIG. 32 is a GUI of a rules tab of an alerts dashboard. The rules tab can include an alert rule list that lists the rules established for triggering alerts. The list can include a rule name, a state of whether the rule is active, muted or inactive, a date and time the rule was last triggered, the type of monitoring associated with the rule, and an application associated with the rule.

Figure 33:
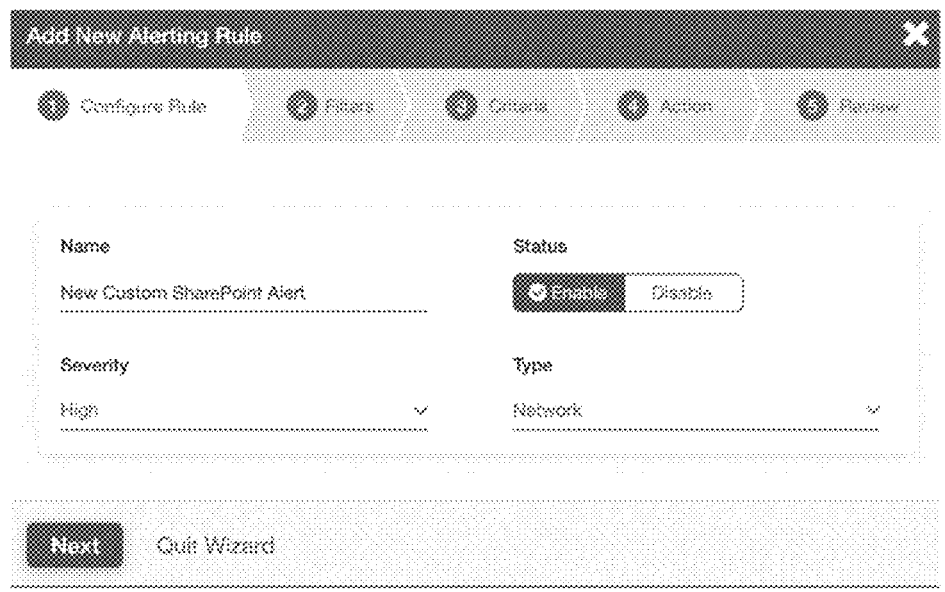
FIGS. 33-39 are screens of a GUI for alert rule configuration.

FIGS. 33-39 are screens of a GUI for alert rule configuration. The alert rule can be configured under a new tab of the GUI under a configuration called Alerts. The Alert rule can be associated with an application and one or more monitors. As can be seen in FIG. 33, the rule can be configured with an alert name, a severity level, a type of alert, and can be enabled or disabled at creation. This can be accomplished in the configure rule screen of the GUI, such as the screen shown in FIG. 33.

The severity level can be selected from a plurality of severities, which can be predetermined, defined by an administrator, and the like. As illustrated in FIG. 33, the severity level can be selectable from a drop down menu. For example, severity levels can be identified as: high, where a critical incident with outage impact occurs, such as when a key application is down for all users; medium, where a critical incident with significant impact occurs, such as when a key application is not accessible for a subset of users; and low, where a minor inconvenience to users occurs, such as when usable performance degradation occurs.

Figure 34:
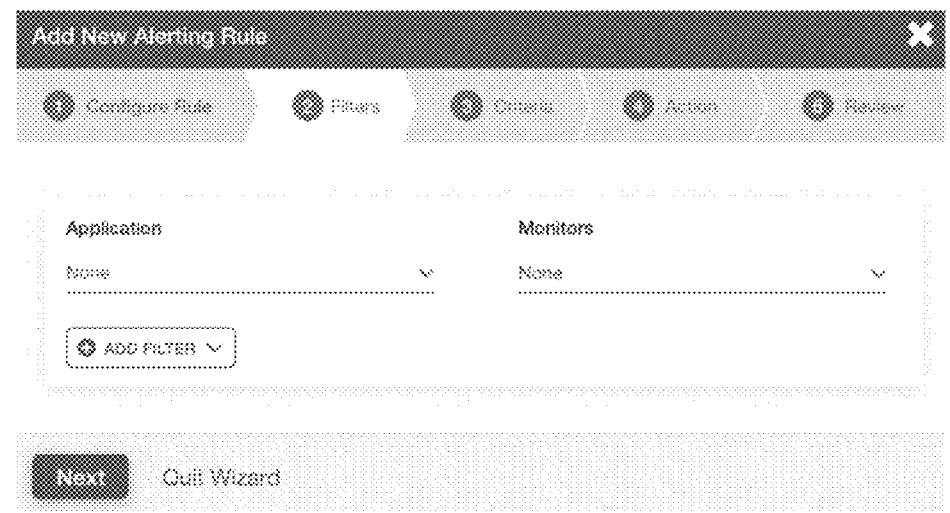
Figure 35:
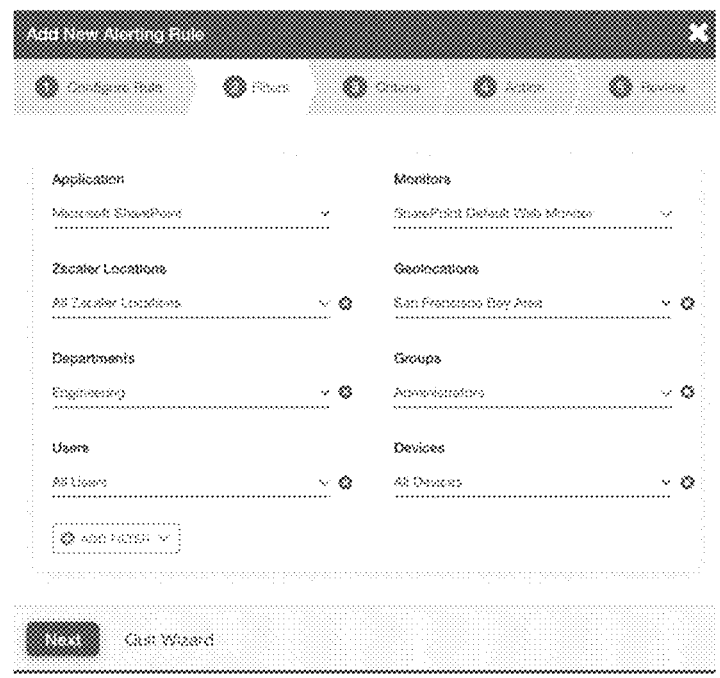

As can be seen in FIG. 34, the alert rule can further be configured by selecting an application and/or a monitor. Filters can also be selected. As shown in FIG. 35, these filters can include one or more locations, groups, departments, users, geolocations, and devices. Other filters can also be selected, such as operating systems and operating system versions. This can be accomplished in the filters screen of the GUI, such as the screen/expanded screen shown in FIGS. 34 and 35.

Figure 36:
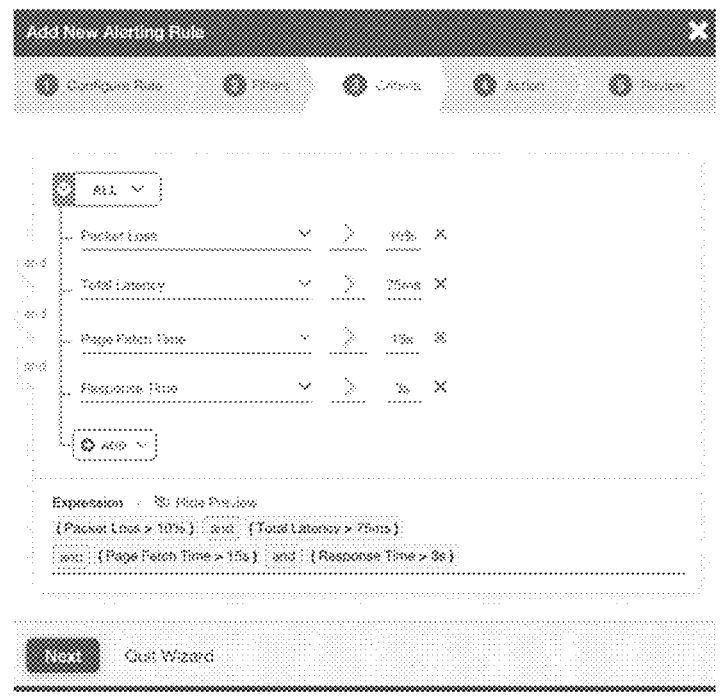

As can be seen in FIGS. 36, the alert rule can further be configured by selecting which metrics, such as: a ZDX Score; web (fetch time, DNS time, error etc.); traceroute (latency, percent loss, number of hops, incomplete trace route); device health (CPU, memory, etc.); any other criteria disclosed herein, and the like. The threshold or conditions of those metrics that will trigger the alert can also be set. These conditions can be set where any condition met will trigger the alert or where all of the conditions need to be met to trigger the alert. The alert criteria can include percentages, durations, number of times in a row that the condition occurs, etc. An operator can indicate whether the criteria that occurs is less than (<), greater than (>), equal to (=), less than or equal to (≤), greater than or equal to (≥), an error message (!=), and the like. For example, for web monitor, HTTP Code >=500, for a traceroute, percent loss ≥1%, for a SharePoint, score <50%, and for a device percent, CPU >80% 10 times in a row. This can be accomplished via a criteria screen of the GUI.

The determination of when an alert is raised can be based on baselined data. For example, one vendor can compare the metric value to a weighted average of all historical metric data and if the value is greater than the average value by a predetermined or selected value of standard deviations, then the alert is raised.

Figure 37:
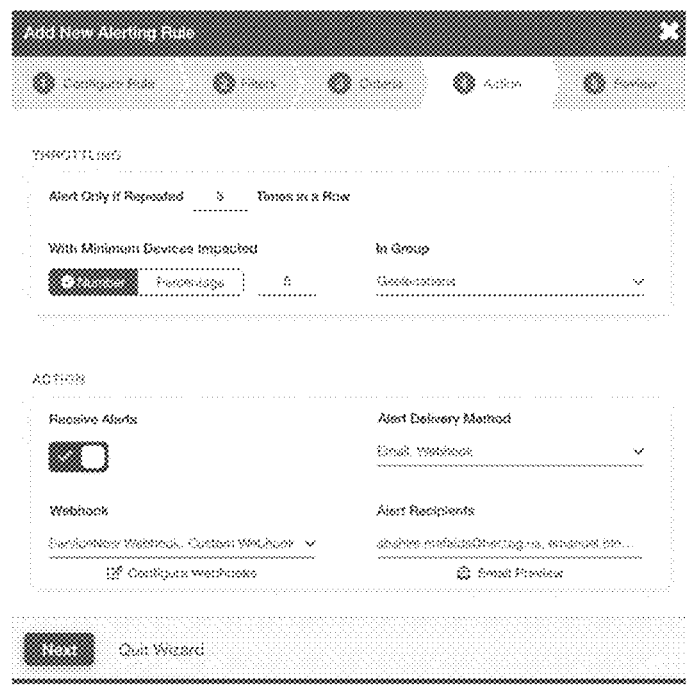

As can be seen in FIG. 37, the action taken when the alert is triggered can also be configured. This can include selecting a throttling value for a number of times the event needs to occur in a row, how many devices are impacted based on either a number or percentage of devices, and the type of notification that is sent, such as email, Webhook, etc. This can be accomplished via an action screen of the GUI.

Figure 38:
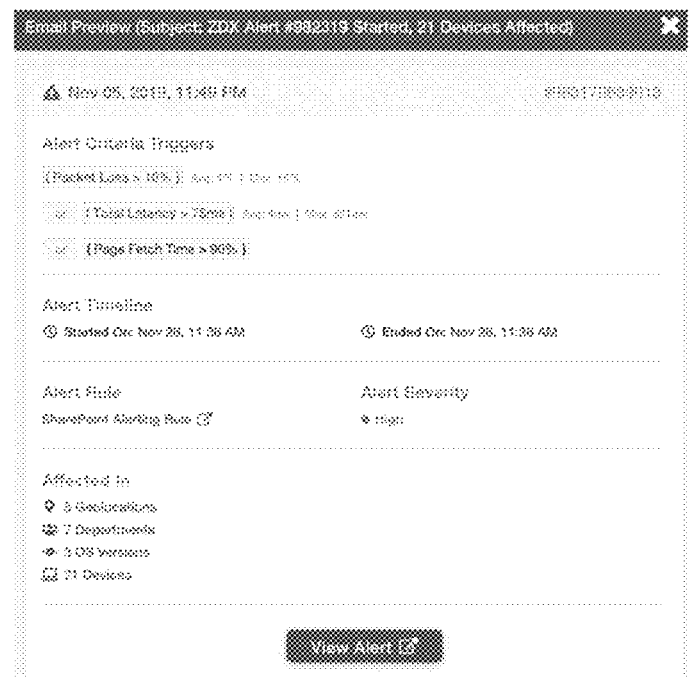
Figure 39:
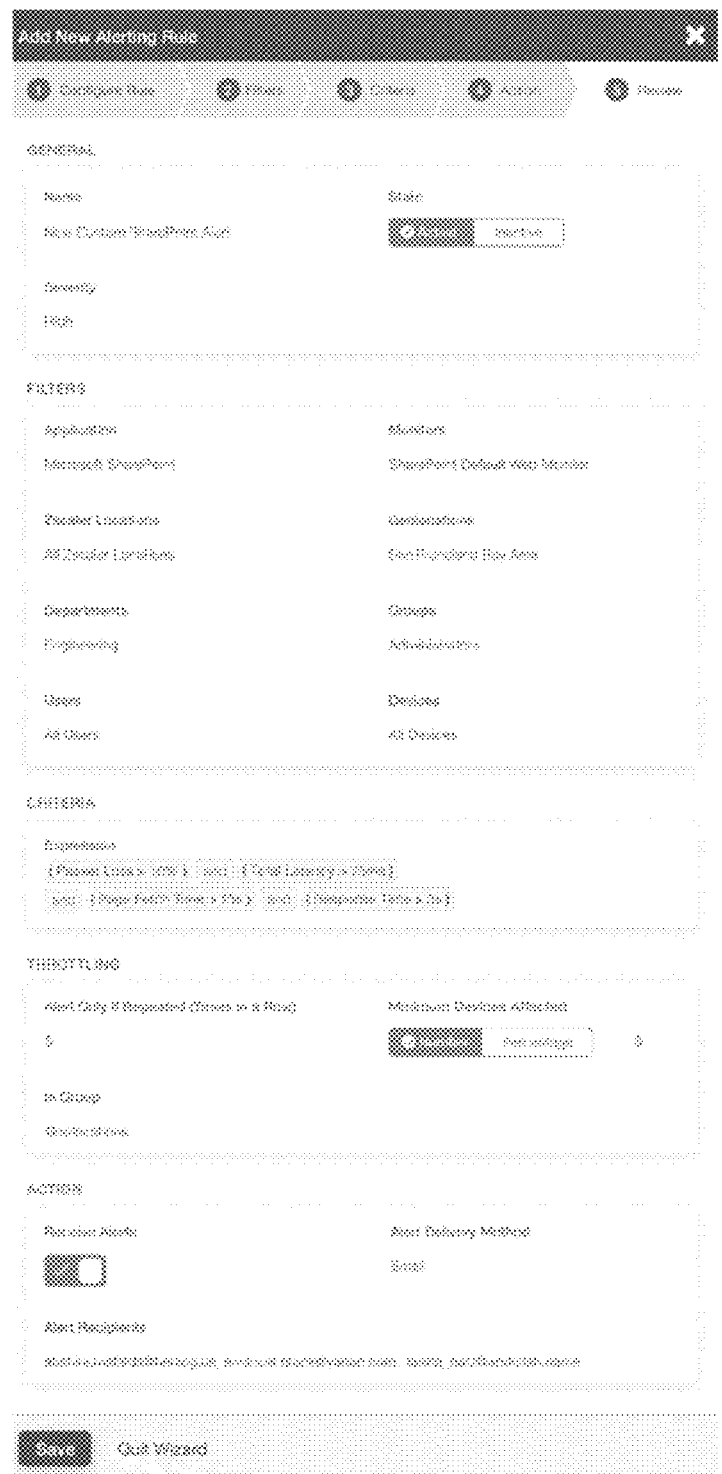

As can be seen in FIG. 38, a preview of the notification, such as an email preview, can be provided for review. Further, as can be seen in FIG. 39, a review of all of the alert settings can be provided, such as in a review screen of the GUI, such that all of the configurations, filters, criteria, and actions can be reviewed simultaneously.

Referring again to FIG. 21, the GUI can display a list of alerts that occurred within a predetermined or selected timeframe, such as 24 hours, 48 hours, 3 days, 7 days, 30 days, etc. The alerts displayed can be filtered by a global filter, by application, location, geo location, user(s), device type, operating system, operating system version, and the like. The alert display can include a chart that shows UX scores and numbers of alerts. The list view can also be filtered by clicking on or selecting the alerts number.

The list view can include a number of columns providing information with regards to each alert. The list view can include columns for alert identification, an alert name, an alert status (active, cleared, disabled, muted), an alert start time, an alert duration (no end time if alert still active), a monitor name (source of the alert), metrics values that caused the alert to trigger, action taken (email) with a link to the Alert action, impacted geo locations with a score, impacted locations with a score, impacted applications with score, number of impacted users (with link to users), impacted groups, impact departments, impacted device types, and the like.

The list view of the alerts can be configured to auto refresh on a predetermined or selected time interval, such as once a minute. The list view can also be sorted based on the columns, and administrators can disable, suppress, and clear a single alerts or multiple alerts in a single action.

Identifiers, such as color coding can be included in the list view of alerts to quickly identify certain aspects of the alerts, such as if the alerts are active, cleared, muted, disabled, and enabled. For example, an active alert can be shown as red for high severity and orange for a warning severity, a cleared alert can be shown as green, a muted alert can be shown as blue, and a disabled alert can be shown as gray.

Figure 40:
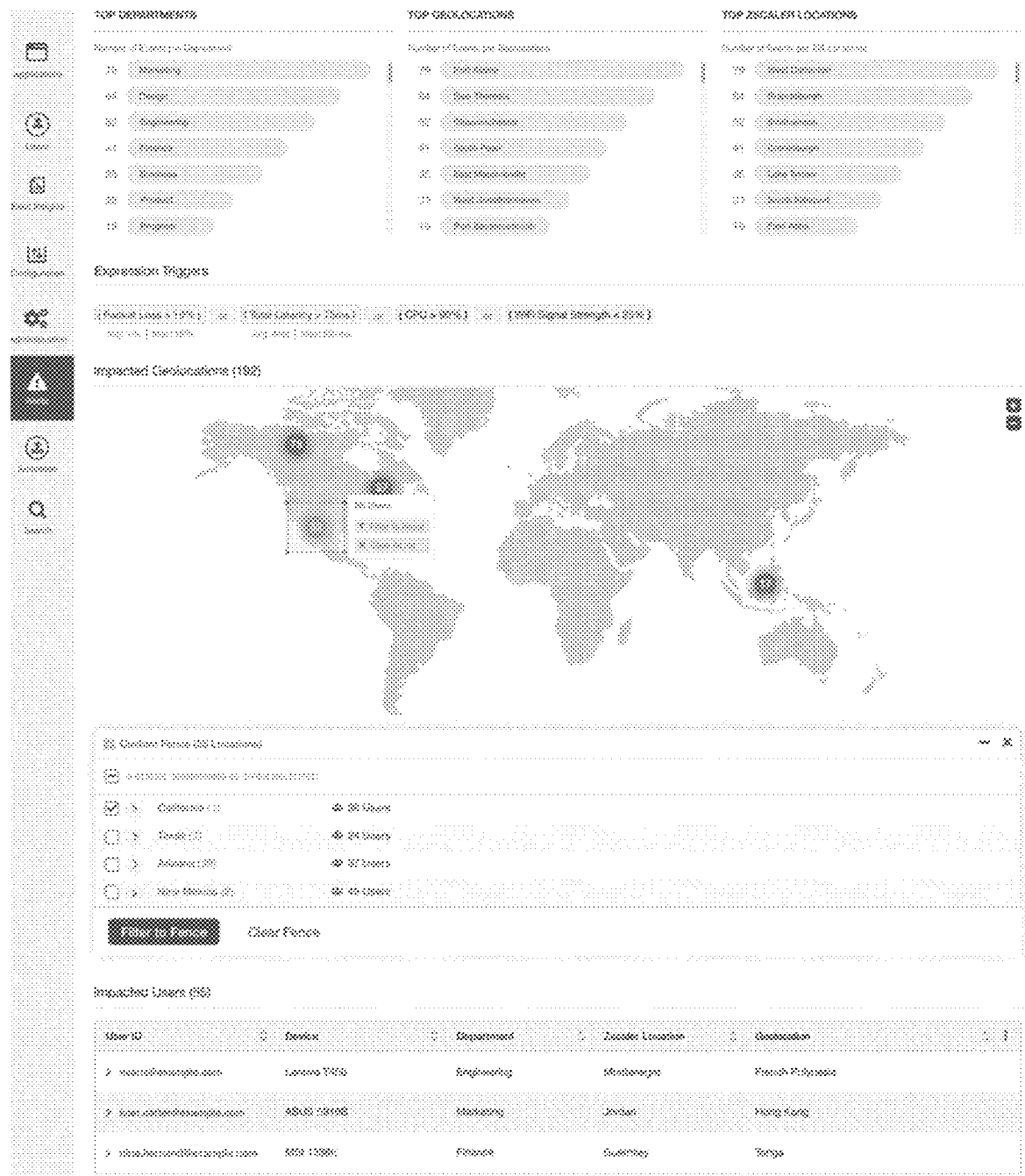
FIG. 40 is a GUI of an alert detail page.

FIG. 40 is a GUI of an alert detail page. The alert detail page can be reached, for example, by selecting a link from a notification or by selecting the alert from the list view of alerts. The alerts detail page can include a map illustrating the impacted geolocations along with a number of events that occurred at that location, which can be an overlay on the map. The alerts detail page can also include a list view of the locations (such as defined fences) with the number of users impacted and can include a list view of the users impacted. The list view of the users impacted can include columns for a user identification, the device, the department, the location, the geolocation, the operating system, the operating system version, and the like.

The alert detail page can also list the departments, geolocations, and locations impacted with a number of events that occurred for each department, geolocation, and location. The alert detail page can further list the rules (expression triggers) that define the events that trigger the alert.

Again, alert actions can include sending email notifications to one user or a list of users, sending one or more webhooks, and sending one or more notifications via third party integration, such as by sending alert data to an external event, incident management or operations center system such as ServiceNow, Slack, PagerDuty, and the like.

Email notifications can rely on email configurations of the cloud-based system 100, and thus, may not require configuration of the email server and authentication within the GUI for configuration of the alerts. Establishing an alert for email notifications can simply require the one or more email addresses that the alert will be sent to.

The webhooks can make an HTTP post request on a configured URL and can pass formatted alert data in the post request body. The alert data can include an alert ID, a callback URL to Alert information (GET URL), an alert owner, an alert type, an impacted application, a number of impacted users, and the like. The data for the webhook can be XML, JSON, CSV, and the like.

The GUI can include screens to create the webhook. The webhook configuration screen can include a name, a URL, an authentication type, such as basic authentication (user/password fields), bearer token (token field), and the like. The webhook configuration screen can also provide a section for testing the webhook, which upon testing the webhook provides an indication on whether the test was successful or failed.

Figure 41:
FIG. 41 is a GUI of a UX dashboard.

FIG. 41 is a GUI of a UX dashboard. The UX dashboard can include an alert event and impacted user volume on all UX trends and metrics charts with the ability to drill down to the alerts views or to the user view. Further, the geolocations map can include an alerts view, that when selected, can display a heatmap of the alerts across geo locations. A size of the alert circle, along with a number displayed therein can identify the number of alerts at the geolocation. An indicator, such as a color, can indicate a severity of the alerts. As can be seen in FIG. 41, upon scrolling over or selecting an alert circle on the map, further information including a name of the geolocation, the number of high severity alerts, and a total number of alerts can be displayed. Selecting the further information can link to a detailed view of the alerts at the corresponding geolocation.

Alerts can be created as private, where only the administrator that created the alert can view the alert or administrators given permission to view the alert can view the alert, or can be created as public where the alert is shared across and viewable by all administrators. The GUI can also include a suppression option, which allows administrators to suppress an alert for a predetermined or selected period of time.

The GUI can also include a testing option. Under the testing option, a screen is displayed which allows an alert, being created or already created, to be tested against historic data of the cloud-based system 100. The historic data can be filtered by timeframe, location, geolocation, and the like.

§ 10.0 TELEMETRY AND POLICY GATEWAY (TPG)

Figure 42:
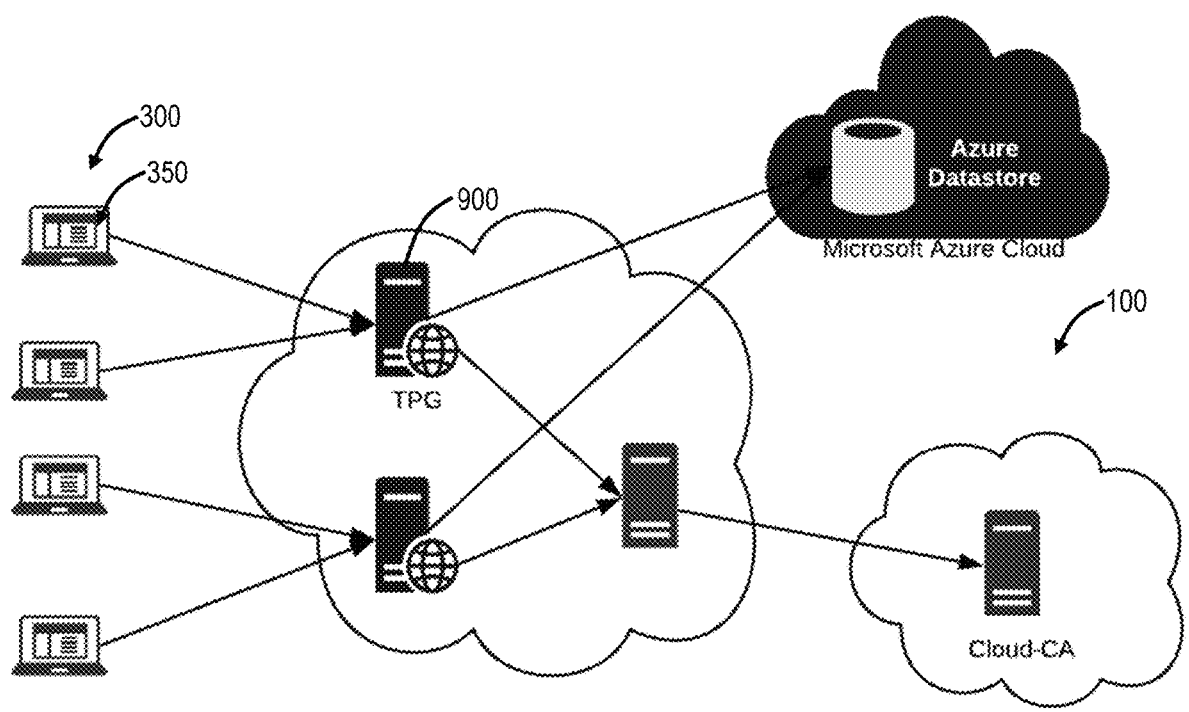
FIG. 42 is a network diagram of a Telemetry and Policy Gateway (TPG).

FIG. 42 is a network diagram of a Telemetry and Policy Gateway (TPG) 900. As described herein, digital experience monitoring can be a service offered via the cloud-based system 100 for monitoring user performance. The TPGs 700 are a primary point of contact for the connector application 350 for the purpose of download policies and pushing collected statistics. The challenge here is to scale both vertically as well as horizontally since there can be millions or more of applications 350 communicating with the TPG 900. The TPG 900 can run as an application in servers 200 utilizing the RESTful framework 510 which simplifies the communication design between the applications 350. Of course, the communication with the application 350 is one example such as for configuration updates and metric publications; other examples are contemplated.

Highlights of the TPG 900 include optimizing the updates of the latest policies/configuration to the devices 300, such as by managing version numbers. This way the connected devices 300 will download policies only when there is a change in a policy for that device 300. Also, there is a reduction of the load on upstream data/config stores by caching policies and customizing the policy on a per device basis. The TPG 900 acts as not just a cache but has the ability to customize the configuration on a per device basis, thus relieving stress on the upstream data/config stores. The TPG 900 has the ability to add Geo location information to the metrics uploaded by the devices 300 based on the data transmitted. The TPG identifies the device location by looking into any of the location identifiable parameters like IP address or Lat/Long and publishes that data into the data store.

The TPG 900 can aggregate data to optimize the upload and the storage of the data into any third-party data store. So when multiple devices upload their data into the TPG, it can aggregate data across multiple devices and push that to any data store helping save compute cycles on expensive data stores. Also, the TPG 900 can be a stateless and horizontally scaling server—as this is a stateless server, it is possible seamlessly add and remove an instance into the cluster. The management of a transaction state is managed by the entities talking to the TPG 900.

The TPG 900 itself is multi-tenant and has a scope of single clouds. The connector applications 350 use RESTful endpoints to push data (metrics) and request for policies.

Figure 43:
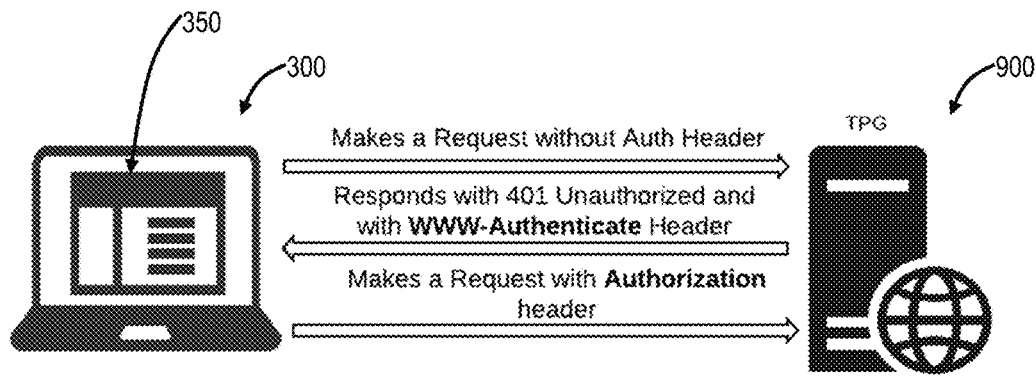
FIG. 43 is a diagram illustrating authentication between a user device and the TPG.

FIG. 43 is a diagram illustrating authentication between a user device 300 and the TPG 900. In an embodiment, the TPG 900 can use digest Authentication to authenticate with a connector application 350. The connector application 350 sends the device credentials (Device ID and password) in the digest authentication HTTP header. The following illustrates an example

| | |
|---|---|
| Application 350 to TPG 900 | GET /tpg/ HTTP/1.1<br>Host: 10.66.106.19<br>User-Agent: curl/7.50.3<br>Accept: */* |
| TPG 900 to application 350 | HTTP/1.1 401 Unauthorized<br>Server: Zscaler<br>Cache-control: no-cache<br>Content-Length: 0<br>WWW-Authenticate: Basic |
| Application 350 to TPG 900 | GET /tpg/policy HTTP/1.1<br>Authorization: Basic ZGlkPTcwMTYxJnVpZD02NzY5NyZjbG91ZD16 c2NhbGVydHdvLm5ldDoxODI3NjQ1MjczNDc2MzU5<br>User-Agent: PostmanRuntime/7.16.3<br>Accept: */*<br>Cache-Control: no-cache<br>Postman-Token: 75c06a97-3802-4d6b-8f4c-25d2004f4e82<br>Host: 10.66.106.10<br>Accept-Encoding: gzip, deflate<br>Content-Length: 0<br>Connection: keep-alive |
| TPG 900 to application 350 | HTTP/1.1 200 OK<br>Server: Zscaler<br>Content-Length: 0 |

Figure 44:
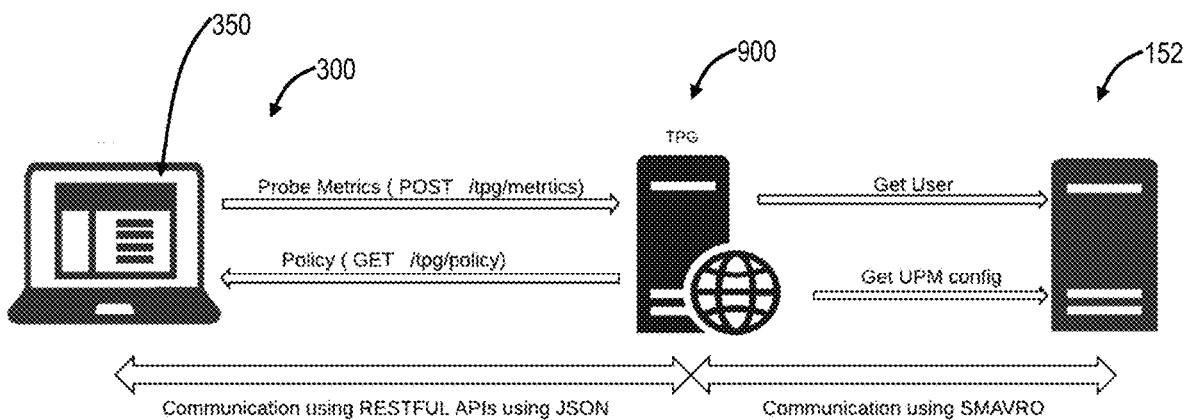
FIG. 44 is a diagram illustrating communication between a user device and the TPG.

FIG. 44 is a diagram illustrating communication between a user device 300 and the TPG 900. The communication between the application 350 and the TPG 900 will be through REST endpoints. The data will be exchanged using JSON format. The TPG 900 can connect to the central authority node 152, such as using a proprietary format.

The TPG 900 can include various RESTful endpoints, and they all require basic authentication. The endpoints can include a GET/policy, a POST/metrics, and a POST/updates. The GET/policy endpoint can provide policy downloads for UPM policy from a central authority node 152. The POST/metrics endpoint can accept metrics payload from the applications 350, populate location info and user info, and then push it to a data store.

§ 10.1 TPG Request and Caching

The TPG 900 caches objects it fetches from the central authority node 152, such as user configuration (User Performance Management (UPM)) and configuration for each tenant. The following provides an example:

<TPG Service IP>/tpg/policy?version=<version number>&locid=<location id>

| Response Code | Comments |
|---|---|
| 200 OK | Policy Download is Successful |
| 204 No Content | If no new policy is available that is newer than the requested version. Only Returned when policy version requested is non-zero. |
| 429 Too Many Requests | This allows us to do Flow control. The server is busy processing requests. ZAPP should try again later after the "Retry-After" seconds sent in the response header. |
| 401 Unauthorized | Authentication is required. Send a valid authentication header. The response contains the realm for the authentication. |
| 403 Forbidden | The credentials didn't match. |
| 400 Bad Requests | Invalid Requests. Make sure the query parameters are correct. |
| 500 Server Error | Error at the server end. Need to raise escalation for such errors. |

A version number can be used to control the versioning of configurations. The version number is used to avoid downloading policies when there are no changes. Clients can extract version number from the downloaded config and send the same version number on the next request. It can always request version 0 if it is requesting the config for the first time.

§ 10.2 Flow for Policy

Figure 45:
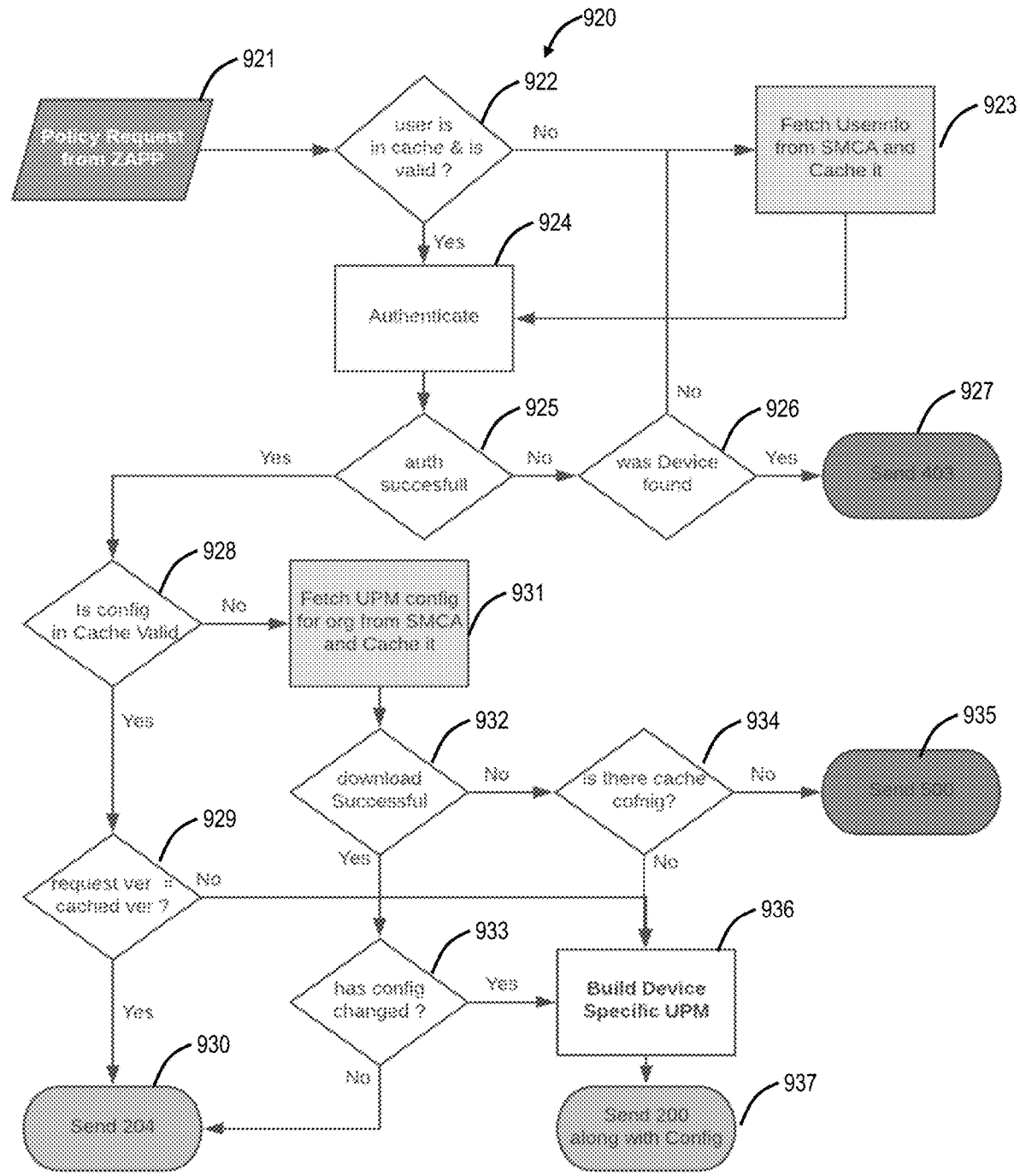
FIG. 45 is a flowchart illustrating a process of policy flow associated with the TPG.

FIG. 45 is a flowchart illustrating a process 920 of policy flow associated with the TPG 900. A policy request is sent from a connector application (921), and the TPG checks if the user is in the cache and is valid (step 922). If not, the TPG can fetch user info from a central authority and cache it (step 923). The TPG then authenticates the user (step 924). If the authentication is not successful (step 925), and if the device was not found (step 926), the process 920 returns to step 923, otherwise if the device was found (step 926), the process 920 concludes and sends a code 403 (step 927).

If the authentication is successful (step 925), the process 920 includes checking if the configuration in the cache is valid (step 928), and, if so, checks if a requested version is the same as the cached version (step 929), and, if so, terminates and sends a code 204 (step 930). If the configuration in the cache is not valid (step 928), the TPG fetches a UPM configuration for the organization from the central authority and caches it (step 931).

If the download is successful (step 932), the process 920 checks if the configuration has changed (step 933), and, if not, the process 920 terminates and sends a code 204 (step 933). If the download is bit successful (step 932), the process 920 checks if there is a configuration in the cache (step 934), and, if not, the process 920 terminates and sends a code 500 (step 935). If there is no configuration in the cache (step 934) or if the configuration has changed (step 933), the process 920 includes building a device specific UPM (step 936), and the process 920 terminates and sends code 200 along with the configuration (step 937).

§ 10.3 TPG Process

Figure 46:
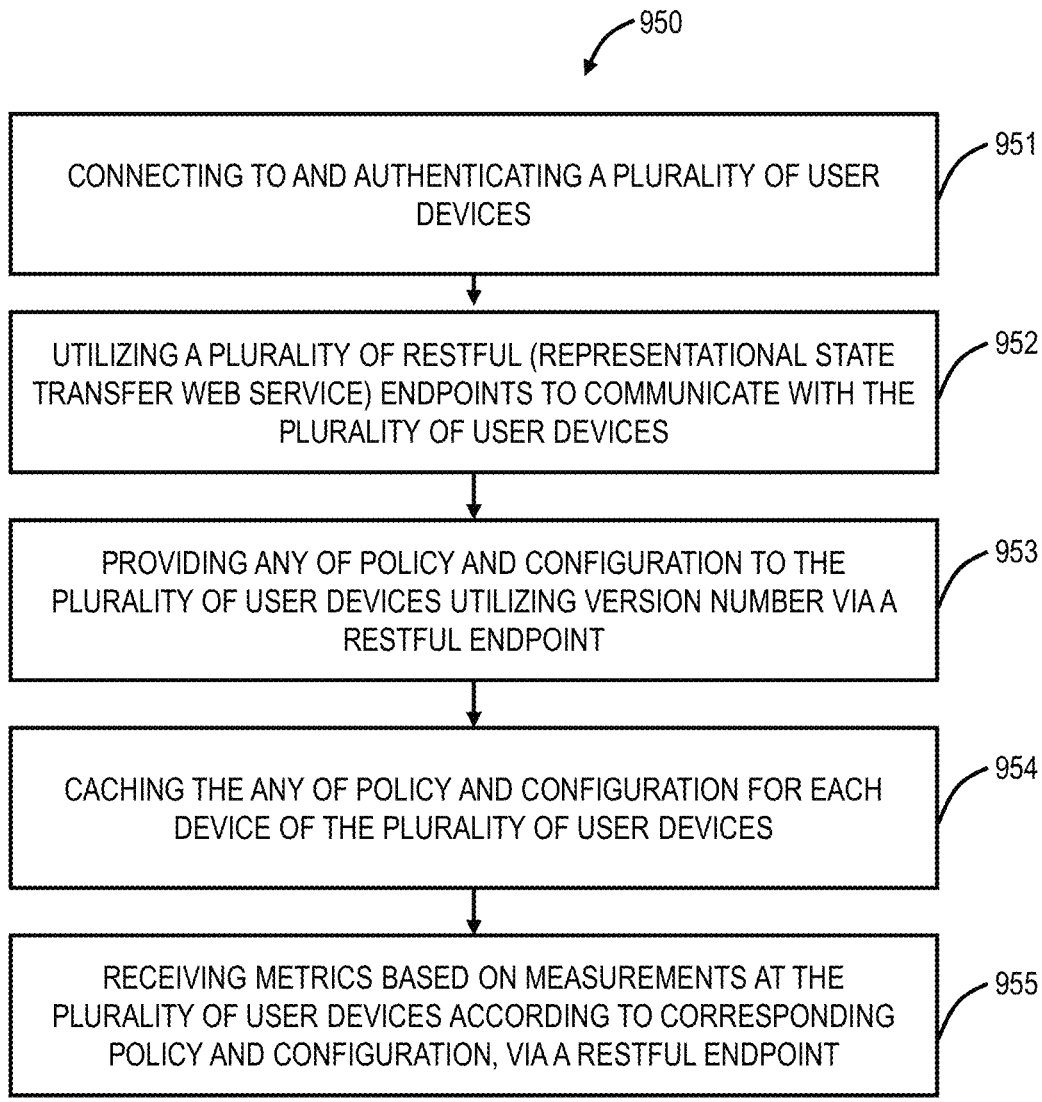
FIG. 46 is a flowchart of a process implemented by a TPG.

FIG. 46 is a flowchart of a process 950 implemented by a TPG 900. The process 950 can be a computer-implemented method, implemented as instructions stored in a computer-readable medium and executed by one or more processors, or by an apparatus such as the enforcement node 150 or the server 200 or the TPG 900.

The process 950 includes connecting to and authenticating a plurality of user devices (step 951); utilizing a plurality of RESTful (Representational State Transfer web service) endpoints to communicate with the plurality of user devices (step 952); providing any of policy and configuration to the plurality of user devices utilizing version number via a RESTful endpoint (step 953); caching the any of policy and configuration for each device of the plurality of user devices (step 954); and receiving metrics based on measurements at the plurality of user devices according to corresponding policy and configuration, via a RESTful endpoint (step 955).

The process 950 can further include obtaining the any of policy and configuration from a central authority associated with the cloud-based system. The process 950 can further include publishing the received metrics to a cloud metric store associated with the cloud-based system. The process 950 can further include aggregating received metrics from some or all of the plurality of devices; and publishing the aggregated received metrics to a data store. The process 950 can further include adding geo location information to the received metrics based on location identifiable parameters. The cloud-based system can include the TPG node and one or more additional TPG nodes, each TPG node is stateless with respect to one another. The received metrics can be associated with user experience monitoring.

§ 10.4 RESTful Framework

The present disclosure includes a RESTful framework that is a library for creating a RESTful server, such as in the cloud-based system 100. The library provides Application Programming Interfaces (APIs) for app configuration, request handling, and logging. The present disclosure includes an approach using HTTP for communication between modules or services, moving towards a RESTful framework for transferring state and data. That is, the goal is not to decompose a whole monolith but instead help achieve higher modularity for new requirements and rewrites that are not so time sensitive by creating microservices, i.e., a hybrid between a monolith and microservices where the monolith is designed for time sensitive operations while microservices are used for non-time sensitive operations. The RESTful framework describes support for microservices and applications with a monolith.

§ 11.0 REAL USER MONITORING (RUM)

Figure 47:
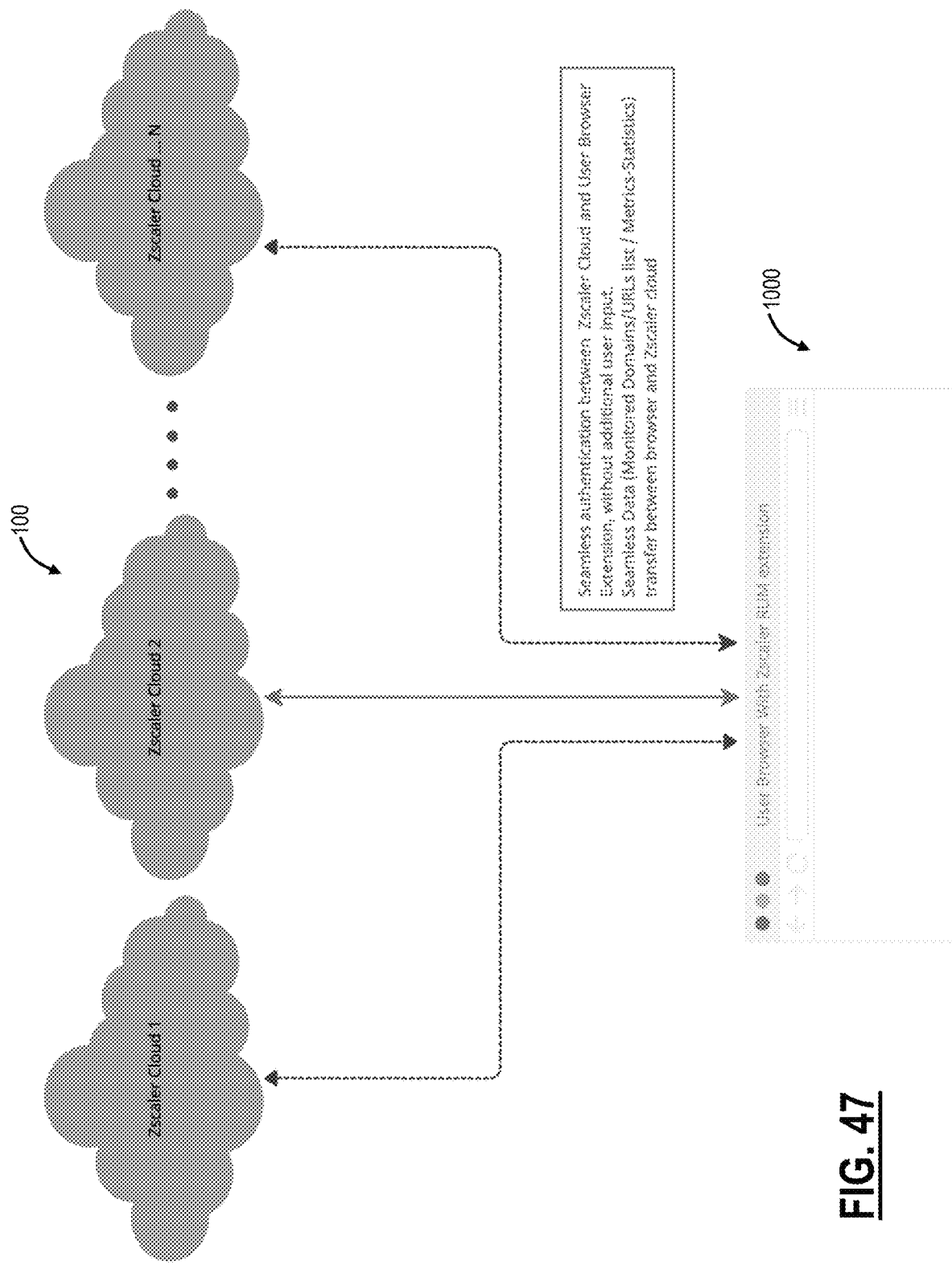
FIG. 47 is diagram of a browser extension on a user device communicating to the cloud-based system, such for RUM.

FIG. 47 is diagram of a browser extension 1000 on a user device 300 communicating to the cloud-based system 100, such for RUM. Also, the browser extension 1000 can include the UPM browser extension described herein. This RUM feature helps us get a true real picture of the user's experience by having a plugin installed on a browser or the like executed on the user device 300 that can post the RUM metrics to either an intermediate aggregator such as the application 350 or directly to a data lake, such as in the cloud-based system 100. This approach is different from the traditional RUM solutions where the destination server injects a JavaScript (JS) into the web pages it is serving and gets the RUM statistics from the user's browser which only that provider can view. In our approach, the IT admin of the organization can configure any domain/URL or list of domains/URLs to be monitored and the plugin will calculate the RUM Statistics/Metrics for domains/URLs specified and push calculated Statistics/Metrics to our data lake for analysis that the customer can view. This gives our customers the unique ability to view the RUM Statistics/Metrics of any user in their org to get an insight into their digital experience.

In this approach, the user's browser is enabled with a plugin either by the user 102 installing the plugin herself or by the IT admin pushing the plugin via a Mobile Device Management (MDM) service. This plugin will have the ability to:

1) Identify itself as a trusted entity.
2) Periodically pull configuration from a "central authority" such as the TPG 900 to get an updated list of domains/URLs and other assets to monitor and gather stats on.
3) When users visit a monitored domain/URL, we calculate RUM statistics/metrics/errors, via the plugin.
4) The plugin pushes Statistics/Metrics to the data lake, e.g., in the cloud-based system 100.
5) The plugin buffers, persists, aggregates and processes Statistics/Metrics for monitored domains/URLs before pushing them to the data lake.
6) The plugin can display Statistics/Metrics in an Extension UI for all URLs whether monitored or not.
7) The plugin can gather detailed user/device/browsing metrics and store it locally so that it can be served on demand when requested to. This gives us the ability to avoid uploading larger volumes of data to save on storage costs while reserving the ability to obtain the data when needed.
8) The plugin can add custom HTTP headers into requests.

Once the plugin is installed, all its functions including authentication are done transparently.

Of note, RUM can use either a plugin or the browser extension 1000. Collectively, these can be referred to as browser add on that provide software code for additional functionality at the browser to perform RUM. Those skilled in the art recognize the difference between a plugin and browser extension, namely extensions are usually just source code, but plug-ins are always executables (i.e., object code).

RUM can be used with synthetic monitoring where we proactively send traffic to websites to gather performance data. The browser extension 1000 for RUM can detect the following on web browsers:

| Start of Navigation | HTTP Req/Resp Start-End |
| --- | --- |
| Redirects | DOM load time |
| DNS | Page Load Time |
| Connect Establishment/ | Java Script and AJAX |
| teardown (including SSL) | Error Detection |

§ 11.1 Approaches to RUM

RUM at the user device 300 can be zero-touch where no changes made on the user device 300, i.e., no new software needs to be installed on the devices 300. The node 150 can inject the 'JS' into the response payloads. JS is inserted to the URLs that match the policy and have content-type:text/html. In the present disclosure, a browser extension/Plugin approach is proposed where we will install a plugin or extension, i.e., browser add on, and add on the browsers of the user device that will capture all the timings on the domains/URLs of interest. A disadvantage of the zero-touch approach is the requirement to insert JS code into responses resulting in CPU cycles at the nodes 150 as well as a requirement for SSL scans.

Also, the RUM add on can be used in addition to various digital experience monitoring techniques described herein including monitoring in the cloud-based system 100 and synthetic probes. With the architecture of the cloud-based system 100, the user device 300, etc., digital experience monitoring can provide visibility end-to-end.

§ 11.2 RUM Process

Figure 48:
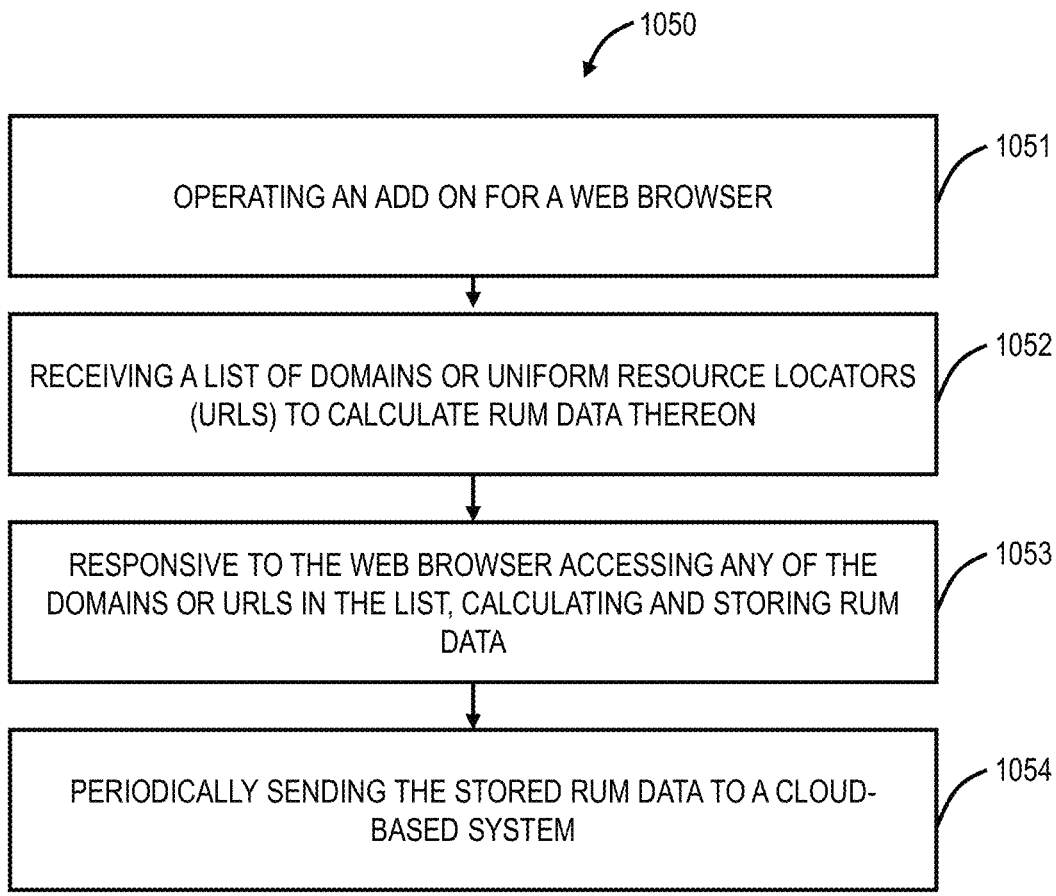
FIG. 48 is a flowchart of a process implemented by a user device for RUM.

FIG. 48 is a flowchart of a process 1050 implemented by a user device 300 for RUM. The process 1050 can be a computer-implemented method, implemented as instructions stored in a computer-readable medium and executed by one or more processors, or by an apparatus such as the user device 300.

The process 1050 includes operating an add on for a web browser (1051); receiving a list of domains or Uniform Resource Locators (URLs) to calculate RUM data thereon (step 1052); responsive to the web browser accessing any of the domains or URLs in the list, calculating and storing RUM data (step 1053); and periodically sending the stored RUM data to a cloud-based system (step 1054). The RUM data can include statistics, metrics, and errors that are detected based on any of start of navigation, redirects, Domain Name System (DNS), connection establishment and teardown, Hypertext Transfer Protocol (HTTP) request and response start and end, Document Object Model (DOM) load time, page load time, and Java Script and AJAX error detection.

The process 1050 can further include receiving the add on prior to the operating via a user installing the add on or via the add on being pushed to the user device. The RUM data can be first RUM data, and the process 1050 can further include calculating and storing second RUM data for domains or URLs not on the list; and displaying the first RUM data and/or the second RUM data on a User Interface on the user device. The process 1050 can further include processing the RUM data locally at the user device prior to periodically sending. The add on can be a browser extension or plugin.

§ 12.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause at least one processor associated with a user device communicatively coupled to a cloud-based system to perform steps of:
    installing a plugin or browser extension on the user device;
    retrieving a configuration for the plugin from a central authority of the cloud-based system, the configuration comprising a list of domains to be monitored by the plugin, thereby allowing an admin of an organization to configure any domain or list of domains to be monitored by the plugin to calculate Real User Monitoring (RUM) statistics for specified domains and push calculated statistics for analysis that the organization can view;
    performing inline monitoring, and detecting the user device is accessing a monitored domain based on the configuration;
    responsive to the user device accessing the monitored domain, determining, via the plugin or browser extension, RUM statistics for the monitored domain; and
    providing the RUM statistics, via the plugin or browser extension to any of a connector application executing on the user device, and a cloud-based service.

2. The non-transitory computer-readable medium of claim 1, wherein the instructions that, when executed, further cause the at least one processor to perform steps of:
    detecting the user device is accessing any of a plurality of monitored domains based on the configuration;
    determining additional real user monitoring (RUM) statistics for the any of the plurality of monitored domains; and
    providing the additional RUM statistics to the cloud-based service.

3. The non-transitory computer-readable medium of claim 1, wherein the instructions that, when executed, further cause the at least one processor to perform steps of:
    prior to the providing, one or more of buffering and processing the RUM statistics on the user device.

4. The non-transitory computer-readable medium of claim 1, wherein the instructions that, when executed, further cause the at least one processor to perform steps of:
    prior to the providing, receiving a request from the cloud-based service for any RUM statistics stored at the user device.

5. The non-transitory computer-readable medium of claim 1, wherein the instructions that, when executed, further cause the at least one processor to perform steps of:
    displaying on the user device analytics associated with the RUM statistics as well as any statistics for any visited domain.

6. The non-transitory computer-readable medium of claim 1, wherein the configuration includes a list of domains to monitor, determined by an organization associated with a user of the user device.

7. The non-transitory computer-readable medium of claim 1, wherein the RUM statistics are based on any of start of navigation, redirects, Domain Name System (DBS), connection establishment and teardown, Hypertext Transfer Protocol (HTTP) request and response start and end, Document Object Model (DOM) load time, page load time, and Java Script and AJAX error detection.

8. A method performed by a user device communicatively coupled to a cloud-based system, the method comprising steps of:
- installing a plugin or browser extension on a user device;
- retrieving a configuration for the plugin from a central authority of the cloud-based system, the configuration comprising a list of domains to be monitored by the plugin, thereby allowing an admin of an organization to configure any domain or list of domains to be monitored by the plugin to calculate Real User Monitoring (RUM) statistics for specified domains and push calculated statistics for analysis that the organization can view;
- performing inline monitoring, and detecting the user device is accessing a monitored domain based on the configuration;
- responsive to the user device accessing the monitored domain, determining, via the plugin or browser extension, RUM statistics for the monitored domain; and
- providing the RUM statistics, via the plugin or browser extension to any of a connector application executing on the user device, and a cloud-based service.

9. The method of claim 8, wherein the steps further include:
- detecting the user device is accessing any of a plurality of monitored domains based on the configuration;
- determining additional real user monitoring (RUM) statistics for the any of the plurality of monitored domains; and
- providing the additional RUM statistics to the cloud-based service.

10. The method of claim 8, wherein the steps further include:
- prior to the providing, one or more of buffering and processing the RUM statistics on the user device.

11. The method of claim 8, wherein the steps further include:
- prior to the providing, receiving a request from the cloud-based service for any RUM statistics stored at the user device.

12. The method of claim 8, wherein the steps further include:
- displaying on the user device analytics associated with the RUM statistics as well as any statistics for any visited domain.

13. The method of claim 8, wherein the configuration includes a list of domains to monitor, determined by an organization associated with a user of the user device.

14. The method of claim 8, wherein the RUM statistics are based on any of start of navigation, redirects, Domain Name System (DBS), connection establishment and teardown, Hypertext Transfer Protocol (HTTP) request and response start and end, Document Object Model (DOM) load time, page load time, and Java Script and AJAX error detection.

15. A cloud service executed on a plurality of nodes of a cloud-based system, each of the plurality of nodes including at least one processor, wherein the cloud-based system is communicatively coupled to a plurality of user devices and is configured to:
- communicate with the plurality of user devices, wherein each user device is associated with a user from an organization of a plurality of organizations, and wherein each user device includes a plugin or browser extension installed thereon,
- provide configuration information to any of the plurality of user devices where the configuration information includes a plurality of domains to be monitored by the plugin or browser extension, wherein the plugin or browser extension is configured to perform inline monitoring and/or determine real user monitoring (RUM) statistics when a given user device accesses one of the plurality of domains, thereby allowing an admin of the organization to configure any domain or list of domains to be monitored by the plugin to calculate Real User Monitoring (RUM) statistics for specified domains and push calculated statistics for analysis that the organization can view, and
- receive the RUM statistics from any of the plugin or browser extension, and a connector application executing on the plurality of user devices.

16. The cloud service of claim 15, wherein the cloud service is further configured to:
- periodically request the RUM statistics from the any of the plurality of user devices, wherein the any of the plurality of user devices are configured to store associated RUM statistics locally.

17. The cloud service of claim 15, wherein the cloud service is further configured to:
- obtain measurements based on synthetic monitoring and combine the RUM statistics with the measurements based on synthetic monitoring.

18. The cloud service of claim 15, wherein the cloud service is further configured to:
- analyze and combine the RUM statistics, and
- display analytics associated with the analyzed and combined RUM statistics.

19. The cloud service of claim 15, wherein the plurality of domains include a list of domains determined by an organization associated with a user of the user device.

20. The cloud service of claim 15, wherein the RUM statistics are based on any of start of navigation, redirects, Domain Name System (DBS), connection establishment and teardown, Hypertext Transfer Protocol (HTTP) request and response start and end, Document Object Model (DOM) load time, page load time, and Java Script and AJAX error detection.

\* \* \* \* \*